(12) United States Patent
Casilli

(10) Patent No.: US 10,505,751 B2
(45) Date of Patent: Dec. 10, 2019

(54) SYNERGISTIC INTERFACE SYSTEM FOR A BUILDING NETWORK

(75) Inventor: Chris Casilli, Morriston, FL (US)

(73) Assignee: Siemens Industry, Inc., Alpharetta, GA (US)

(*) Notice: Subject to any disclaimer, the term of this patent is extended or adjusted under 35 U.S.C. 154(b) by 1615 days.

(21) Appl. No.: 13/218,132

(22) Filed: Aug. 25, 2011

(65) Prior Publication Data

US 2013/0054033 A1 Feb. 28, 2013

(51) Int. Cl.
*H04L 12/28* (2006.01)
*G08B 25/14* (2006.01)

(52) U.S. Cl.
CPC ........ *H04L 12/282* (2013.01); *H04L 12/2827* (2013.01); *G08B 25/14* (2013.01)

(58) Field of Classification Search
CPC .... G08B 25/14; H04L 12/282; H04L 12/2827
USPC ........................................ 700/276
See application file for complete search history.

(56) References Cited

U.S. PATENT DOCUMENTS

| | | | |
|---|---|---|---|
| 6,453,687 B2* | 9/2002 | Sharood | G05B 19/00 62/127 |
| 6,850,252 B1* | 2/2005 | Hoffberg | G06K 9/00369 348/E7.061 |
| 7,203,486 B2 | 4/2007 | Patel | |
| 7,607,091 B2* | 10/2009 | Song | H04B 7/18528 709/201 |
| 8,069,422 B2* | 11/2011 | Sheshagiri | H04L 12/2803 715/744 |
| 8,090,452 B2* | 1/2012 | Johnson et al. | 700/17 |
| 8,185,427 B2* | 5/2012 | Messer | G06F 8/38 705/7.21 |
| 8,346,589 B1* | 1/2013 | Norton | G06Q 10/1093 705/7.18 |

(Continued)

FOREIGN PATENT DOCUMENTS

| | | |
|---|---|---|
| WO | 200017737 A1 | 3/2000 |
| WO | 2005065148 A2 | 7/2005 |
| WO | 2008091433 A1 | 7/2008 |

OTHER PUBLICATIONS

Liao, et al., "A Novel User Authentication Scheme Based on QR-Code", Journal of Networks vol. 5, No. 8, Aug. 2010 (accessed from <<https://pdfs.semanticscholar.org/9df2/e4cecc9b28befd513542ee38276b23d1fd41.pdf>> on Jan. 25, 2019). (Year: 2010).*

(Continued)

*Primary Examiner* — Michael J Huntley

(57) ABSTRACT

An interface system for a building includes at least one mobile computing device configured to read building information indicia positioned within the building, with the building information indicia defining indicia data. The at least one mobile computing device is in wireless communication with a building control system within the building. The building control system is configured to send control signals to a plurality of field devices within the building. The at least one mobile computing devices is configured to transmit indicia data defined by the building information indicia to the building control system. The building control system is configured to control the field devices based at least in part on the indicia data received from the mobile computing devices.

21 Claims, 16 Drawing Sheets

(56) References Cited

U.S. PATENT DOCUMENTS

| | | | | |
|---|---|---|---|---|
| 8,736,418 B2* | 5/2014 | Bozionek | G07C 9/00103 | |
| | | | 340/5.2 | |
| 8,934,482 B2* | 1/2015 | Murai | H04L 67/16 | |
| | | | 370/353 | |
| 2004/0163073 A1* | 8/2004 | Krzyzanowski | H04L 12/2803 | |
| | | | 717/107 | |
| 2005/0289061 A1* | 12/2005 | Kulakowski | G06Q 99/00 | |
| | | | 705/50 | |
| 2006/0074494 A1* | 4/2006 | McFarland | G05B 15/02 | |
| | | | 700/1 | |
| 2006/0259199 A1* | 11/2006 | Gjerde et al. | 700/284 | |
| 2007/0016476 A1* | 1/2007 | Hoffberg | G05B 15/02 | |
| | | | 705/14.64 | |
| 2007/0063866 A1* | 3/2007 | Webb | 340/870.02 | |
| 2007/0143482 A1* | 6/2007 | Zancho | H04M 1/72563 | |
| | | | 709/227 | |
| 2007/0145113 A1* | 6/2007 | Keller | G06K 17/00 | |
| | | | 235/377 | |
| 2007/0194922 A1* | 8/2007 | Nathan | G08B 7/066 | |
| | | | 340/572.1 | |
| 2007/0255725 A1* | 11/2007 | McCoach | 707/10 | |
| 2008/0040477 A1* | 2/2008 | Johnson et al. | 709/224 | |
| 2008/0180228 A1* | 7/2008 | Wakefield | G01S 5/0252 | |
| | | | 340/4.62 | |
| 2008/0209505 A1* | 8/2008 | Ghai et al. | 726/1 | |
| 2008/0209506 A1* | 8/2008 | Ghai | G06F 21/55 | |
| | | | 726/1 | |
| 2009/0287629 A1* | 11/2009 | Gabriel | G06Q 10/02 | |
| | | | 706/47 | |
| 2009/0307255 A1* | 12/2009 | Park | G06Q 10/10 | |
| 2010/0046553 A1* | 2/2010 | Daigle | G06F 21/35 | |
| | | | 370/474 | |
| 2010/0168878 A1* | 7/2010 | Hoonhout | A61L 9/12 | |
| | | | 700/90 | |
| 2011/0054699 A1* | 3/2011 | Imes | F24F 11/0086 | |
| | | | 700/276 | |
| 2011/0082747 A1* | 4/2011 | Khan et al. | 705/14.58 | |
| 2011/0196527 A1* | 8/2011 | De Lille | B23D 47/04 | |
| | | | 700/103 | |
| 2011/0276886 A1* | 11/2011 | Hall | G06Q 10/06 | |
| | | | 715/734 | |
| 2012/0037725 A1* | 2/2012 | Verfuerth | 239/289 | |
| 2012/0085829 A1* | 4/2012 | Ziegler | G09F 3/14 | |
| | | | 235/493 | |
| 2012/0159579 A1* | 6/2012 | Pineau | G07C 9/00166 | |
| | | | 726/4 | |
| 2012/0280783 A1* | 11/2012 | Gerhardt | G07C 9/00309 | |
| | | | 340/5.6 | |
| 2013/0214901 A1* | 8/2013 | Pineau | H04W 4/90 | |
| | | | 340/5.61 | |

OTHER PUBLICATIONS

Potoczny-Jones, Isaac, "Quick authentication using mobile devices and QR Codes", Galois blog, Jan. 5, 2011 (accessed from <<https://galois.com/blog/2011/01/quick-authentication-using-mobile-devices-and-qr-codes/>> on Jan. 25, 2019). (Year: 2011).*

PCT Search Report dated Jan. 16, 2013, for PCT/US2012/052186 (13 pages).

* cited by examiner

SYNERGISTIC INTERFACE SYSTEM FOR A BUILDING NETWORK

FIELD

This application relates to the field of building systems and, more particularly, to human interfaces for building networks.

BACKGROUND

Building control systems encompass a wide variety of systems that aid in the monitoring and control of various aspects of building operation. Building control systems (which may also be referred to herein as "building automation systems") include security systems, fire safety systems, lighting systems, and heating, ventilation, and air conditioning ("HVAC") systems. Lighting systems and HVAC systems are sometimes referred to as "environmental control systems" because these systems control the environmental conditions within the building. A single facility may include multiple building automation systems (e.g., a security system, a fire system and an environmental control system). Multiple building automation systems may be arranged separate from one another or as a single system with a plurality of subsystems that are controlled by a common control station.

The elements of a building automation system are widely dispersed throughout a facility. For example, an HVAC system includes temperature sensors and ventilation damper controls as well as other elements that are located in virtually every area of a facility. Similarly, a security system may have intrusion detection, motion sensors and alarm actuators dispersed throughout an entire building or campus. Likewise, fire safety systems include smoke alarms and pull stations dispersed throughout the facility. To achieve efficient and effective building automation system operation, there is a need to monitor the operation of, and often communicate with, the various dispersed elements of a building automation system.

Building automation systems typically have one or more centralized control stations in which data from the system may be monitored, and in which various aspects of system operation may be controlled and/or monitored. The control station typically includes a computer having processing equipment, data storage equipment, and a user interface. To allow for monitoring and control of the dispersed control system elements, building automation systems often employ multi-level communication networks to communicate operational and/or alarm information between operating elements, such as sensors and actuators, and the centralized control station.

One example of a building automation system control station is the Apogee® Insight® Workstation, available from Siemens Industry, Inc. Building Technologies Division of Buffalo Grove, Ill. ("Siemens"), which may be used with the model Apogee® building automation system, also available from Siemens. In this system, several control stations connected via an Ethernet or another type of network may be distributed throughout one or more building locations, each having the ability to monitor and control system operation.

The typical building automation system (including those utilizing the Apogee® Insight® Workstation) has a plurality of field panels that are in communication with the central control station. While the central control station is generally used to make modifications and/or changes to one or more of the various components of the building automation system, a field panel may also be operative to allow certain modifications and/or changes to one or more parameters of the system. This typically includes parameters such as temperature and otherwise, set port changes, modify a control program, or the like.

The central control station and field panels are in communication with various field devices, otherwise known as "points". Field devices are typically in communication with field panels of building automation systems and are operative to measure, monitor, and/or control various building automation system parameters. Example field devices include lights, thermostats, damper actuators, alarms, HVAC devices, sprinkler systems, speakers, door locks, and numerous other field devices as will be recognized by those of skill in the art. The field devices receive control signals from the central control station and/or field panels. Accordingly, building automation systems are able to control various aspects of building operation by controlling the field devices.

Large commercial and industrial facilities have numerous field devices that are used for environmental control purposes. These field devices may be referred to herein as "environmental control devices". The large number of environmental control devices in these facilities will consume significant amounts of energy. Building automation systems are useful in reducing energy consumption in these facilities by automatically controlling lights and HVAC components at different times during the day. While existing building automation systems are useful in reducing energy consumption in large facilities, additional devices and processes in such systems would be welcomed if they could further reduce energy consumption in such facilities. In addition, it would be advantageous if such improvements in building automation systems could make the environmental conditions even better for individuals within the facility.

SUMMARY

In accordance with one embodiment of the disclosure, there is provided an interface system for a building. The interface system includes a building control system configured to send control signals to a plurality of field devices within the building. The interface system also includes building information indicia positioned at a location in the building, with the building information indicia defining indicia data. Additionally, the interface system includes at least one mobile computing device in wireless communication with the building control system. The at least one mobile computing device is configured to read the building information indicia and transmit the indicia data to the building control system. The building control system is configured to control the field devices based at least in part on the indicia data received from the mobile computing device.

Pursuant to another embodiment of the disclosure, a method of controlling field devices in a building is provided. The method includes receiving indicia data from a mobile computing device, the indicia data associated with one of a plurality of building information indicia positioned at different locations in the building. The method further includes controlling the operation of at least one of a plurality of field devices within the building based at least in part on the indicia data received from the mobile computing device and a user profile associated with the mobile computing device.

In accordance with yet another embodiment of the disclosure, a control system for a building is provided. The control system includes a plurality of environmental control devices configured to control an environmental condition in the building. The control system also includes at least one communication circuit configured to communicate with the plurality of environmental control devices using a building network. In addition, the control system includes a wireless transceiver configured to receive wireless signals from a plurality of mobile computing devices, the wireless signals indicative of building locations. The control system further includes a processing circuit configured to (i) receive the wireless signals from the plurality of mobile computing devices, (ii) associate a building location and a user profile with each of the mobile computing devices, (iii) generate control signals for the plurality of environmental control devices based at least in part on the building location and user profile associated with each of the mobile computing devices, and (iv) deliver the control signals to the at least one communication circuit for communication to the environmental control devices.

The above described features and advantages, as well as others, will become more readily apparent to those of ordinary skill in the art by reference to the following detailed description and accompanying drawings. While it would be desirable to provide an interface system for a building network that provides one or more of these or other advantageous features, the teachings disclosed herein extend to those embodiments which fall within the scope of the appended claims, regardless of whether they accomplish one or more of the above-mentioned advantages.

DESCRIPTION

Figure 1:
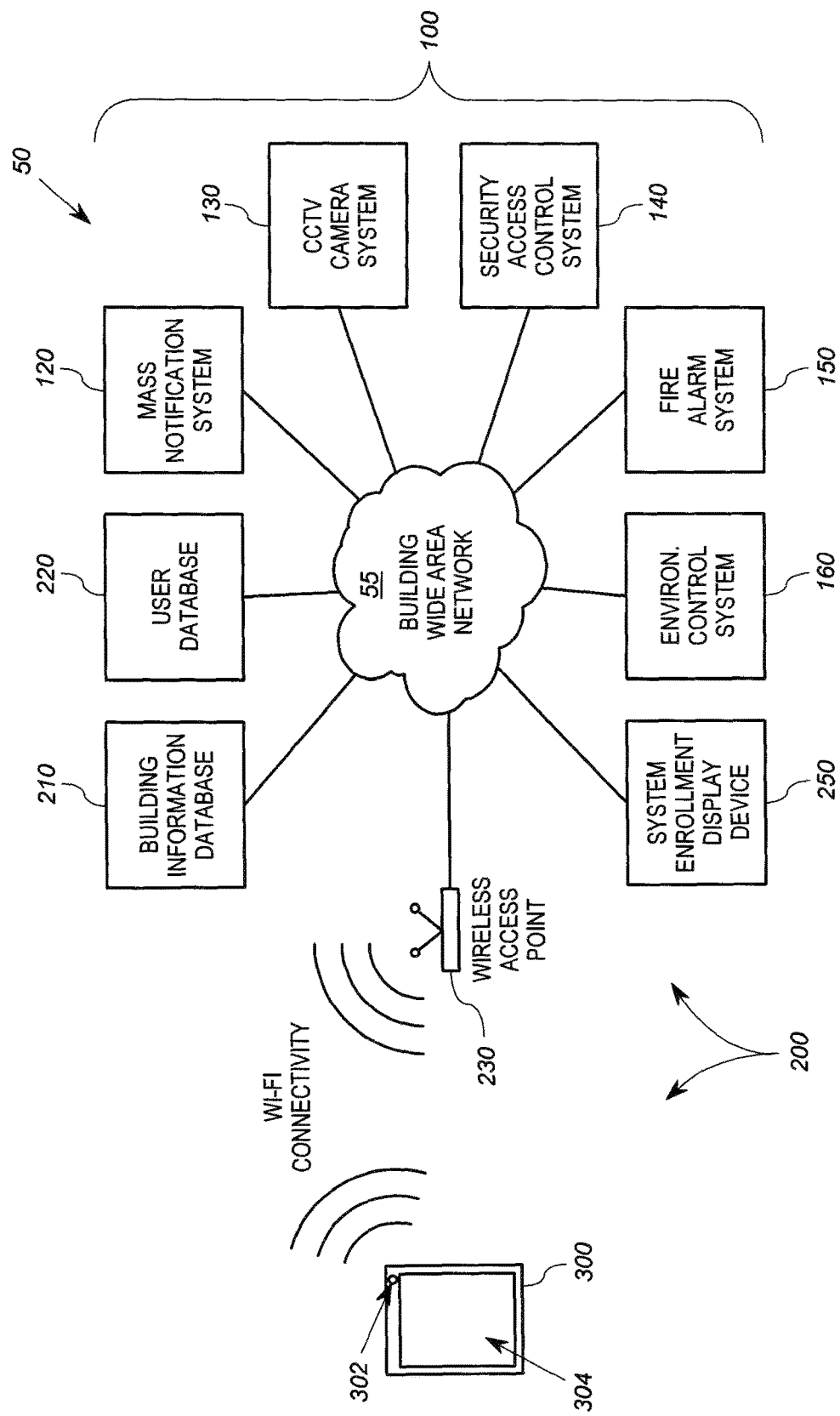
FIG. 1 is an exemplary topology diagram for a building network having a building interface system.

With reference to FIG. 1, an exemplary topology diagram for a building network 50 is shown. The building network 50 includes a plurality of systems and components in wired or wireless communication via a wide area network 55. The building network 50 generally includes a plurality of building automation systems 100 and a building interface system 200 (which may be referred to herein as a "building synergistic interface system" or "BSIS"). The BSIS 200 includes one or more mobile computing devices 300 in communication with the building network 50 via a wireless access point 230. The BSIS also includes one or more system enrollment/display devices 250 connected to the building that houses the building automation system 100. The BSIS further includes data storage devices comprising a building information database 210 and a user database 220 accessible via the wide area network 55. Software applications for the BSIS 200 are stored on both the mobile computing device 300 and the building automation system 100. As will be explained herein, the building interface system 200 allows one or more of the building automation systems to operate more efficiently and effectively based on human actions. In addition, the building interface system 200 allows the building automation system to better share information with humans in the building.

In the following pages, the general arrangement of an exemplary building automation system 100 configured for use with the BSIS 200 is explained first. Thereafter, the general arrangement of the system enrollment/display device 250 is explained followed by the general arrangement of the mobile computing device 300. Overall operation of the overall BSIS 200 is discussed following the description of the BAS, system enrollment/display device 250, and the mobile computing device 300.

Building Automation System

Figure 2:
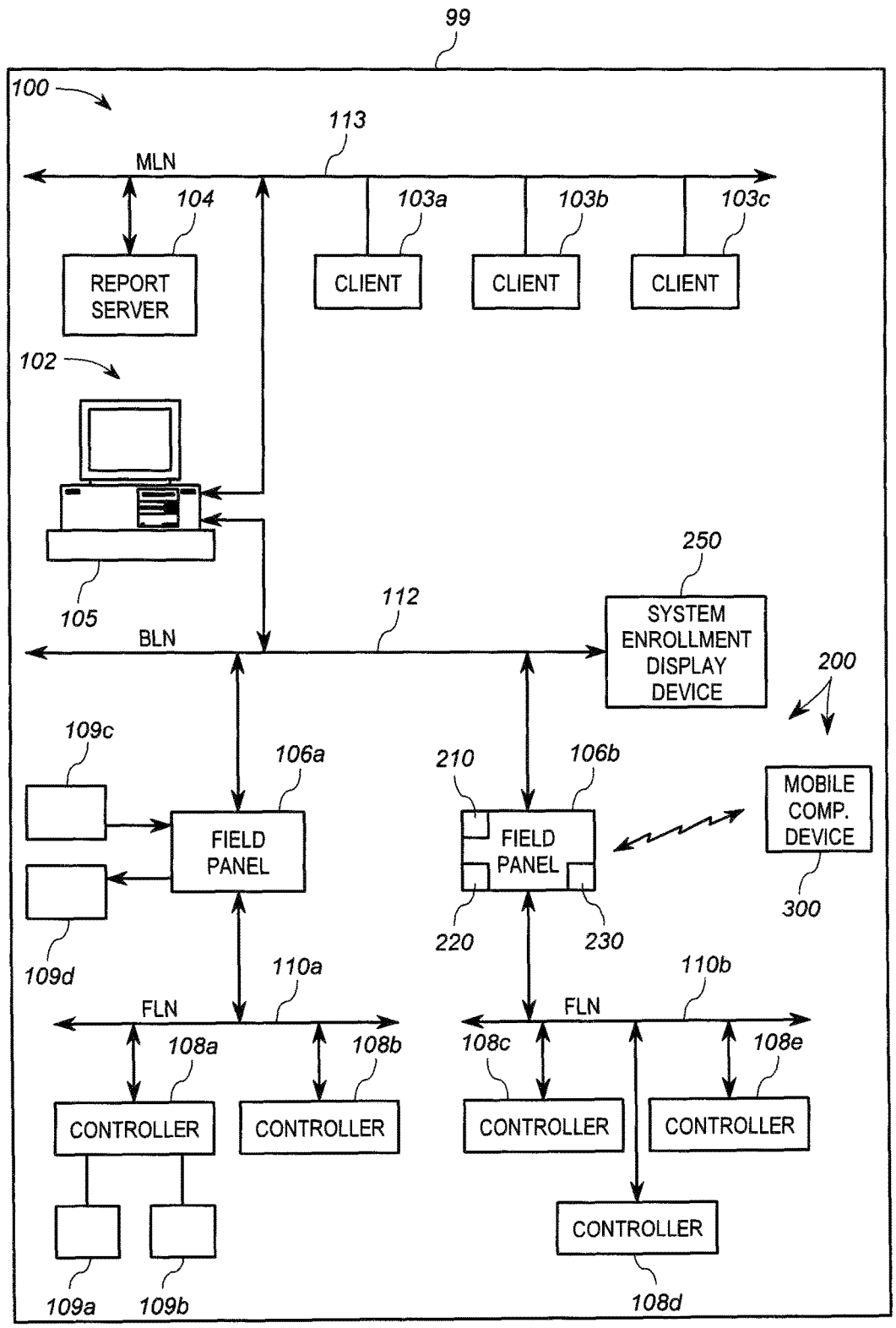
FIG. 2 shows an exemplary block diagram of a building automation system of the building network of FIG. 1.

In the embodiment of FIG. 1, the building automation systems 100 include a mass notification system 120, a closed circuit television system 130, a security system 140, a fire alarm system 150, and an environmental control system 160. FIG. 2 depicts a system block diagram of an exemplary building automation system (BAS) 100 that is part of the building network 20 within a building 99. The building automation system 100 is depicted as a distributed building system that provides control functions for any one of a plurality of building operations, such as environmental control, security, life or fire safety, industrial control and/or the like. An example of a BAS is the Apogee® building automation system available from Siemens Industry, Inc., Building Technologies Division of Buffalo Grove, Ill. The Apogee® building automation system allows the setting and/or changing of various controls of the system, generally as provided below. While a brief description of an exemplary BAS is provided in the paragraphs below, it should be appreciated that the building automation system 100 described herein is only an exemplary form or configuration for a building automation system.

With particular reference to FIG. 2, the building automation system 100 includes at least one supervisory control system or workstation 102, client workstations 103a-103c, report server 104, a plurality of field panels represented by field panels 106a and 106b, and a plurality of controllers represented by controllers 108a-108e. It will be appreciated, however, that wide varieties of BAS architectures may be employed.

Each of the controllers 108a-108e represents one of plurality of localized, standard building control subsystems, such as space temperature control subsystems, lighting control subsystems, or the like. Suitable controllers for building control subsystems include, for example, the model TEC (Terminal Equipment Controller) available from Siemens Industry, Inc., Building Technologies Division, of Buffalo Grove, Ill. To carry out control of its associated subsystem, each controller 108a-108e connects to one or more field devices, such as sensors or actuators, shown by way of example in FIG. 2 as the sensor 109a and the actuator 109b connected to the controller 108a.

Typically, a controller such as the controller 108a effects control of a subsystem based on sensed conditions and desired set point conditions. The controller controls the operation of one or more field devices to attempt to bring the sensed condition to the desired set point condition. By way of example, consider a temperature control subsystem that is controlled by the controller 108a, where the actuator 109b is connected to an air conditioning damper and the sensor 109a is a room temperature sensor. If the sensed temperature as provided by the sensor 109a is not equal to a desired temperature set point, then the controller 108a may further open or close the air conditioning damper via actuator 109b to attempt to bring the temperature closer to the desired set point. It is noted that in the BAS 100, sensor, actuator and set point information may be shared between controllers 108a-108e, the field panels 106a-106b, the work station 102 and any other elements on or connected to the BAS 100.

To facilitate the sharing of such information, groups of subsystems such as those connected to controllers 108a and 108b are typically organized into floor level networks or field level networks ("FLNs") and generally interface to the field panel 106a. The FLN data network 110a is a low-level data network that may suitably employ any suitable proprietary or open protocol. Subsystems 108c, 108d and 108e along with the field panel 106b are similarly connected via another low-level FLN data network 110b. Again, it should be appreciated that wide varieties of FLN architectures may be employed.

The field panels 106a and 106b are also connected via building level network ("BLN") 112 to the workstation 102 and the report server 104. The field panels 106a and 106b thereby coordinate the communication of data and control signals between the subsystems 108a-108e and the supervisory computer 102 and report server 104. In addition, one or more of the field panels 106a, 106b may themselves be in direct communication with and control field devices, such as ventilation damper controllers or the like. To this end, as shown in FIG. 2, the field panel 106a is operably connected to one or more field devices, shown for example as a sensor 109c and an actuator 109d.

The workstation 102 provides overall control and monitoring of the building automation system 100 and includes a user interface. The workstation 102 further operates as a BAS data server that exchanges data with various elements of the BAS 100. The BAS data server can also exchange data with the report server 104. The BAS data server 102 allows access to the BAS system data by various applications. Such applications may be executed on the workstation 102 or other supervisory computers, not shown.

With continued reference to FIG. 2, the workstation 102 is operative to accept modifications, changes, alterations and/or the like from the user. This is typically accomplished via a user interface 105 for or of the computer 102. The user interface may include a keyboard, touchscreen, mouse, or other interface components. The workstation 102 is operable to, among other things, affect or change operational data of the field panels 106a, 106b as well as other components of the BAS 100. The field panels 106a and 106b utilize the data and/or instructions from the workstation 102 to provide control of their respective controllers.

The workstation 102 is also operative to poll or query the field panels 106a and 106b for gathering data. The workstation 102 processes the data received from the field panels 106a and 106b, including trending data. Information and/or data is thus gathered from the field panels 106a and 106b in connection with the polling, query or otherwise, which the workstation 102 stores, logs and/or processes for various uses. To this end, the field panels 106a and 106b are operative to accept modifications, changes, alterations and/or the like from the user.

The workstation 102 also preferably maintains a database associated with each field panel 106a and 106b. The database maintains operational and configuration data for the associated field panel. The report server 104 stores historical data, trending data, error data, system configuration data, graphical data and other BAS system information as appropriate. In at least one embodiment, the building information database 210 and the user database 220 of the BSIS 200 is provided by the BAS data server 102. In other embodiments the building information database 210 and the user database 220 may be stored elsewhere. For example, as shown in FIG. 3, the building information database 210 and the user database 220 may be stored on the field panel.

The management level network (MLN) 113 may connect to other supervisory computers, Internet gateways, or other gateways to other external devices, as well as to additional network managers (which in turn connect to more subsystems via additional low level data networks). The supervisory computer 102 uses the MLN 113 to communicate BAS data to and from other elements on the MLN 113. The MLN 113 may suitably comprise an Ethernet or similar wired network and may employ TCP/IP, BACnet, and/or other protocols that support high speed data communications.

FIG. 2 also shows that the BAS 100 may include or be connected to various components of the BSIS 200. For example, field panel 106b is shown in FIG. 2 as housing the building information database 210, the user database 220 and the wireless access point 230 of the BSIS 200. The mobile computing device 300 is configured for wireless communications with the BAS 100 via the wireless access point 230 provided on the field panel 106b. Additionally, the system enrollment/display device 250 of the BSIS 200 is shown in FIG. 2 as being coupled to the BLN 112. While the foregoing BSIS members are shown in FIG. 2 as being associated with one of the field panels 106b, it will be recognized that in other embodiments these and other BSIS members may be differently positioned in or connected to the BAS 100. For example, the building information database 210, the user database 220 and the wireless access point 230 of the BSIS could be provided on the workstation 102. Alternatively, the building information database 210 and the user database 220 could be housed separately from those components shown in FIG. 2, such as in a separate computer device that is coupled to the building level network 112 or other BAS location. Such a separate computer device could also be used to store BSIS operational software. Similarly, the wireless access point 230 of the BSIS 200 could be housed within the workstation 102 or within a separate computer device coupled to the building level network 112 of the BAS.

Figure 3:
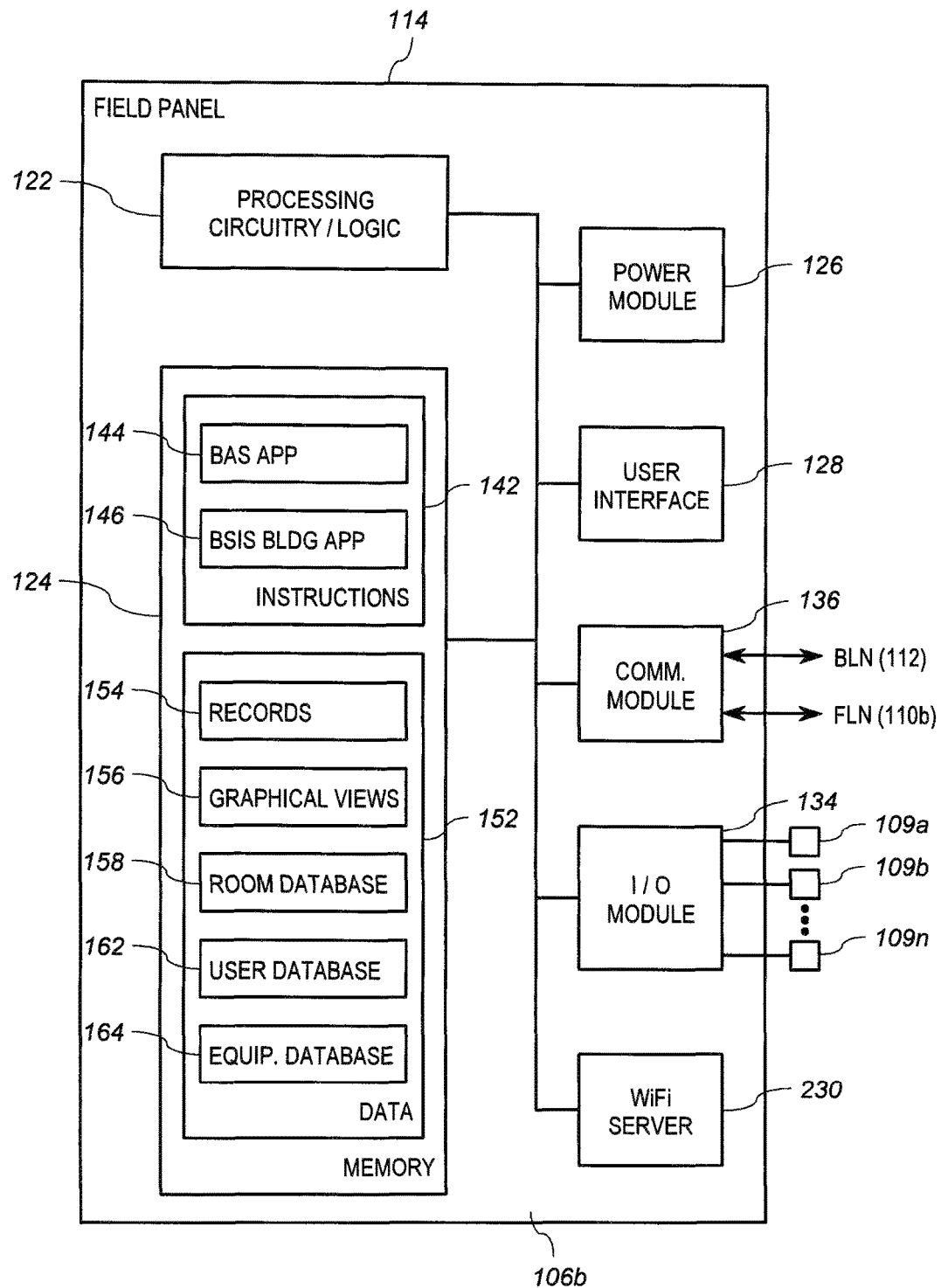
FIG. 3 shows an exemplary internal block diagram of a field panel for the building automation system of FIG. 2.

With reference now to FIG. 3, a block diagram of an exemplary embodiment of the field panel 106b of FIG. 2 is shown. It should be appreciated that the embodiment of the field panel 106a is only an exemplary embodiment of a field panel in a BAS 100 coupled to the BSIS 200. As such, the exemplary embodiment of the field panel 106a of FIG. 3 represents all manners or configurations of field panels that are operative in the manner set forth herein.

The field panel 106a of FIG. 3 includes a housing, cabinet or the like 114 that is configured in a typical manner for a building automation system field panel. The field panel 106a includes processing circuitry/logic 122, memory 124, a power module 126, a user interface 128, an I/O module 134, a BAS network communications module 136, and the wireless access point 230.

The processing circuitry/logic is operative, configured and/or adapted to operate the field panel 106a including the features, functionality, characteristics and/or the like as described herein. To this end, the processing circuit 122 is operably connected to all of the elements of the field panel 106a described below. The processing circuitry/logic 122 is typically under the control of program instructions or programming software or firmware 142 contained in memory 124, explained in further detail below. In addition to storing the instructions 142, the memory also stores data 152 for use by the BAS 100 and/or the BSIS 200.

The field panel 106a also includes a power module 126 that is operative, adapted and/or configured to supply appropriate electricity to the field panel 106a (i.e. the various components of the field panel). The power module 126 may operate on standard 120 volt AC electricity, but may alternatively operate on other AC voltages or include DC power supplied by a battery or batteries.

An input/output (I/O) module 134 is also provided in the field panel 106a. The I/O module 134 includes one or more input/output circuits that communicate directly with terminal control system devices such as actuators and sensors. Thus, for example, the I/O module 134 includes analog input circuitry for receiving analog sensor signals from the sensor 109a, and includes analog output circuitry for providing analog actuator signals to the actuator 109b. The I/O module 134 typically includes several of such input and output circuits.

The field panel 106a further includes a BAS network communication module 136. The network communication module 136 allows for communication to the controllers 108a and 108b as well as other components on the FLN 110a, and furthermore allows for communication with the workstation 102, other field panels (e.g., field panel 106a) and other components on the BLN 112. To this end, the BAS network communication module 136 includes a first port (which may suitably be a RS-485 standard port circuit) that is connected to the FLN 110b, and a second port (which may also be an RS-485 standard port circuit) that is connected to the BLN 112.

The field panel 106a may be accessed locally. To facilitate local access, the field panel 106a includes an interactive user interface 128. Using interface 128, the user may control the collection of data from devices such as sensor 109a and actuator 109b. The user interface 128 of the field panel 106a includes devices that display data and receive input data. These devices may be devices that are permanently affixed to the field panel 106b or portable and moveable. The user interface 128 may suitably include an LCD type screen or the like, and a keypad. The user interface 128 is operative, configured and/or adapted to both alter and show information regarding the field panel 106a, such as status information, and/or other data pertaining to the operation, function and/or modifications or changes to the field panel 106a.

As explained above, communications with the field panel 106b may occur via wired communications (e.g., via communications module 136 or I/O module 134) and via local access to the field panel (e.g., via the user interface). In addition, the field panel 106b is also equipped with the ability to communicate with remote devices via the wireless access point 230. Communications via the wireless access point may be accomplished using any of various known communications protocols, including those using IEEE 802.11 standards. In the embodiment of FIG. 3, the wireless access point is identified as a WiFi server, but it will be recognized that the wireless access point could use a different communications protocol, such as Bluetooth® or ZigBee® protocols.

As mentioned above, the memory 124 includes various programs that may be executed by the processor 122. In particular, the memory 124 of FIG. 3 includes a BAS application 144 and a BSIS building application 146. The BAS application includes conventional applications configured to control the field panel 106b of the BAS 100 in order to control and monitor various field devices 109a-n of the BAS 100. Accordingly, execution of the BAS application 144 by the processor 122 results in control signals being sent to the field devices 109n via the I/O module 134 of the field panel 106b. Execution of the BAS application 144 also results in the processor 122 receiving status signals and other data signals from various field devices 109n, and storage of associated data in the memory 124. In one embodiment, the BAS application 144 may be provided by the Apogee® Insight® BAS control software commercially available from Siemens Industry, Inc. or another BAS control software.

The BSIS building application 146 is configured to facilitate advanced interactions between a human user and the building automation system 100. In particular, the BSIS building application 146 is configured to identify the location of a human user in the building 99, control the BAS 100 based on the location of the human user within the building, and provide building information to the human user via the mobile computing device 300 carried by the user. As explained in further detail below with reference to FIGS. 6-14, the BSIS building application 146 determines the location of the human user within the building based on an association between the mobile computing device 300 and one of a plurality of the system enrollment/display devices 250. Communications between the mobile computing device and the BSIS building application occur via the wireless access point 230.

In addition to the instructions 142, the memory 124 also includes data 152. The data 152 includes records 154, graphical views 156, a room database 158, a user database 162, and an equipment database 164. The records 154 include current and historical data stored by the field panel 106b in association with control and operation of the field devices 109. For example, the records 154 may include current and historical temperature information in a particular room of the building 99, as provided by a thermistor or other temperature sensor within the room. The records 154 in the memory may also includes various set points and control data for the field devices 109, which may be pre-installed in memory 124 or provided by the user through the user interface 128. The records 154 may also include other information related to the control and operation of the BAS app 144 and BSIS building app 146, including statistical, logging, licensing, and historical information.

The graphical views 156 provide various screen arrangements to be displayed to the user in on the mobile computing device 300 or on via the user interface 128. Examples of such screens for display on the mobile computing device 300 are provided in FIGS. 8, 9 and 11, discussed in further detail below.

The room database 158 includes data related to the layout of the building 99. This room database 158 includes a unique identifier for each room or area within the building (e.g., room "12345"). In addition to the unique identifier data, the room database 158 may include other information about particular rooms or areas within the building 99. For example, the room database 158 may include information about field devices located within the room or area, particular equipment (e.g., research equipment, manufacturing equipment, or HVAC equipment) positioned within the room or area.

The user database 162 includes data related to human users who frequent the building 99. Accordingly, the user database 162 includes a unique identifier for each human user (e.g., user "12345") and a user profile associated with that user. The user profile may include information provided by the user or provided by third parties about the user. For example, the user profile may include a preferred temperature or lighting level for the user, which is provided to the user database 162 by the user. Also, the user profile may include a security clearance level, room access, or data access for the user, all provided to the database 162 by a third party, such as the human resources department or security department for the employer who owns the building 99.

The equipment database 164 includes data related to various pieces of equipment within the building 99. The equipment may include field devices associated with the BAS 100 or other equipment that is positioned within the building 99. For example, the equipment database 164 may include information related to manufacturing or research equipment located in a particular room of the building. The equipment database 164 maintains a unique identifier for each piece of equipment (e.g., equipment "12345") and data associated with that equipment. For example, the database 164 may associate particular schematics, operation manuals, photographs, or similar data with a given piece of equipment within the database 164.

While the field panel 106*b* has been explained in the foregoing embodiment as housing the BSIS building application 146 and various BSIS databases, such as the room database 158, user database 162, and equipment database 164, it will be recognized that these components may be retained in other locations in association with the BAS 100. For example, these components could all be retained within the central workstation 102 of the BAS or a separately designated BSIS computing device in the network 50.

System Enrollment/Display Device

Figure 4:
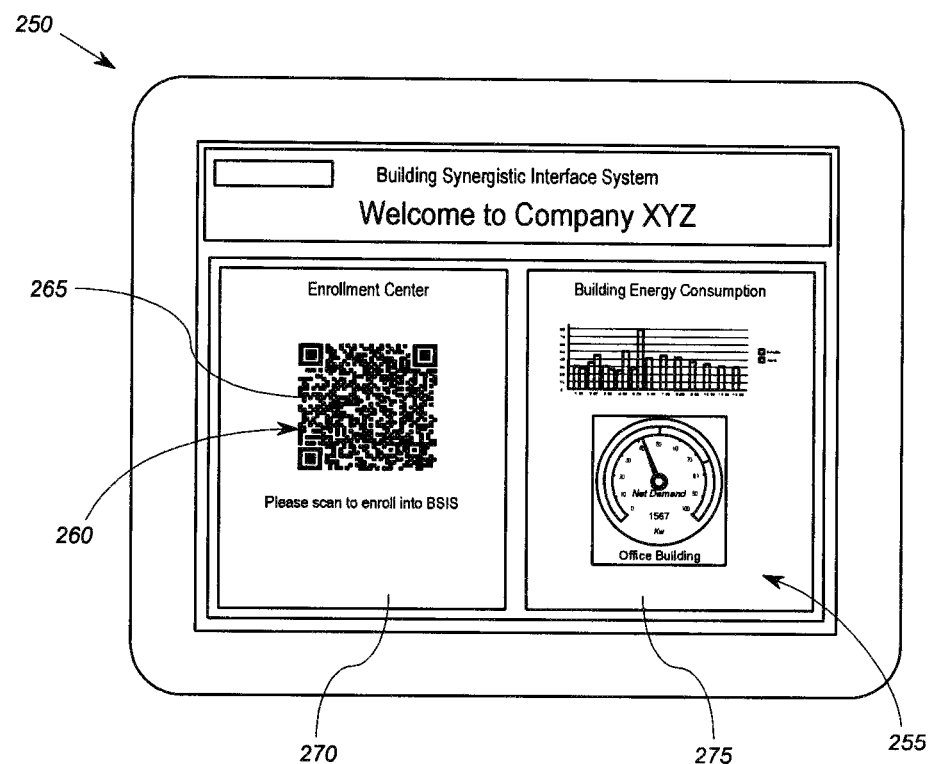
FIG. 4 shows an exemplary front view of a system enrollment/display device for the building interface system of FIG. 1.

With reference now to FIG. 4, an exemplary system enrollment/display device 250 is shown. The system enrollment/display device may be one of a number of different system enrollment/display devices that are mounted to the building 99 at various locations. The system enrollment/display device 250 is configured to present information to a human user, and in some embodiments, may be configured to receive information from the human user. Accordingly, the system enrollment/display device 250 includes a display screen 255, such as a LED, LCD or plasma screen capable of displaying visual data to a human user.

The primary function of the system enrollment/display device 250 is to display building information indicia 260 that can be read by the mobile computing device 300. In the embodiment of FIG. 4, the building information indicia 260 are provided in the form of a 2D barcode 265. This 2D barcode 265 contains data indicative of a particular room or area within the building 99. Thus, the building information indicia 260 may also be referred to herein as a physical world hyperlink ("PWHL"), because a mobile computing device that reads the building information indicia 260 is linked with a physical location within the building that is associated with the building information indicia. In the example of FIG. 4, the 2D barcode 265 provides a pattern that is indicative of one the unique identifiers for one of the rooms in the room database 158 (see FIG. 3).

The system enrollment/display device 250 displaying the 2D barcode 265 is mounted to the building 99 at a location that is within or in close proximity to the room associated with the 2D barcode. For example, if the system enrollment/display device 250 is mounted on a wall in the main lobby of the building 99, the 2D barcode 260 presented on the screen 255 is a pattern that is associated with the main lobby of the building. As another example, if the system enrollment/display device 250 is mounted next to the doorway or other threshold of a testing lab in the building 99, the 2D barcode 260 presented on the screen 255 is a pattern that is associated with the testing lab. Accordingly, the 2D barcode 265 associated with a particular location is always provided in close proximity to that location within the building 99.

In addition to providing information related to a particular location within the building, the 2D barcode may also be associated with additional building information. For example, the 2D barcode may provide data indicative of particular equipment within the building, such as a laboratory testing station, a piece of manufacturing equipment, or a piece of HVAC equipment. In some embodiments, the building information indicia 260 may provide data indicative of a piece of equipment in lieu of data related to a particular location. In these embodiments, the room database 158 or equipment database 164 (described above with reference to FIG. 3) may link the equipment to a physical location in the building 99. In other embodiments, the building information indicia 260 may include data associated with both equipment and a location.

In addition to building location and equipment information, the building information indicia 260 may also be associated with additional information related to the building 99. For example, the building information indicia 260 may include data indicative of a current date or time, or current room parameters. Examples of such room parameters may include current environmental conditions, security conditions, or other parameters that may be detected or tracked by the BAS. Although a 2D barcode 265 is shown in FIG. 4 as one possible type of building information indicia 260, it will be recognized that numerous other types of building information indicia are possible, such as 1D barcodes or other indicia associated with optical character recognition or other types of automatic identification and data capture methods.

The system enrollment/display device 250 may be coupled to the BLN 112 or a FLN 110*a* of the BAS 100. Accordingly, the system enrollment/display device 250 is configured to receive information from the BAS 100 and display such information on the screen 255. This information may include the building information indicia 260 (e.g., 2D barcode 265) as well as other information that may be beneficial to a human user, such as building information, weather information, current news, time of day, or other information. For example, in the embodiment of FIG. 4, the left half 270 of the screen displays the building information indicia 260, while the right half 275 of the screen displays energy consumption information for the building. As another example, the right half 275 of the screen may provide directions for using the BSIS 200 or general information about the BSIS 200.

As noted above, the screen 255 of the system enrollment/display device 200 of FIG. 4 is a dynamic display that is capable of changing over time. This is true of both the user information provided on the screen as well as the building information indicia 260. For example, if the building information indicia 260 are provided by a 2D barcode, the 2D barcode may include time of day information that changes by the second. As another example, the 2D barcode may include information about the number of users in the building or other dynamic information.

In addition to a display screen 255, the system enrollment/display device may include additional components that allow the human to interface with the BAS 100. For example, in at least one embodiment, the screen 255 is a touch screen that allows a user to input data via the screen 255. The system enrollment/display device 250 may also include additional components, such as speakers, microphones, cameras, various data communications ports, and other interface components, including those that are commonly found on televisions and computer monitors. These additional interface components may be used to provide the human user with helpful features, such as providing audio instructions for the BSIS 200 to a human user. These additional interface components may also be used by security to provide surveillance cameras and intercoms at various locations within the building. Additionally, the interface components may be used by maintenance when operational issues arise with the system enrollment/display device 250.

While the system enrollment/display device 250 has been explained above as displaying dynamic data and having multiple electronic features, in other embodiments the system enrollment/display device 250 may configured to display only static data and be free of electronic components. In such an arrangement, the system enrollment/display device 250 may be a printed sign posted outside of a room or a doorway that identifies the room and displays the building information indicia 260. For example, the system enrollment/display device 250 may include a room name and number printed in ink with a 2D barcode printed in ink next to the room name and number. When a plurality of system enrollment/display devices 250 are present in a building 99, a combination of static and dynamic devices may be used, including printed signs as described in this paragraph in combination with devices with screens and various electronic components, as described above in association with FIG. 4.

Mobile Computing Device

In addition to the system enrollment/display devices 250, the BSIS also includes a mobile computing device 300. The mobile computing device 300 may be provided by any mobile device capable of being carried by a human, reading the building information indicia 260, and communicating with the BAS 100 via the wireless access point 230. The mobile computing device 300 shown in FIG. 1 includes a camera 302 that is configured to read the building information indicia 260 and a screen 304 that serves as a user interface. As also indicated in FIG. 1, the mobile computing device 300 is configured to communicate with the BAS 100 by WiFi connectivity via the wireless access point 230 to the WAN 55. Exemplary mobile computing devices include personal digital assistants, smart phones, and handheld personal computers (e.g., Droid®, iOS iPhone®, iPod®, iPad Touch®, etc.).

Figure 5:
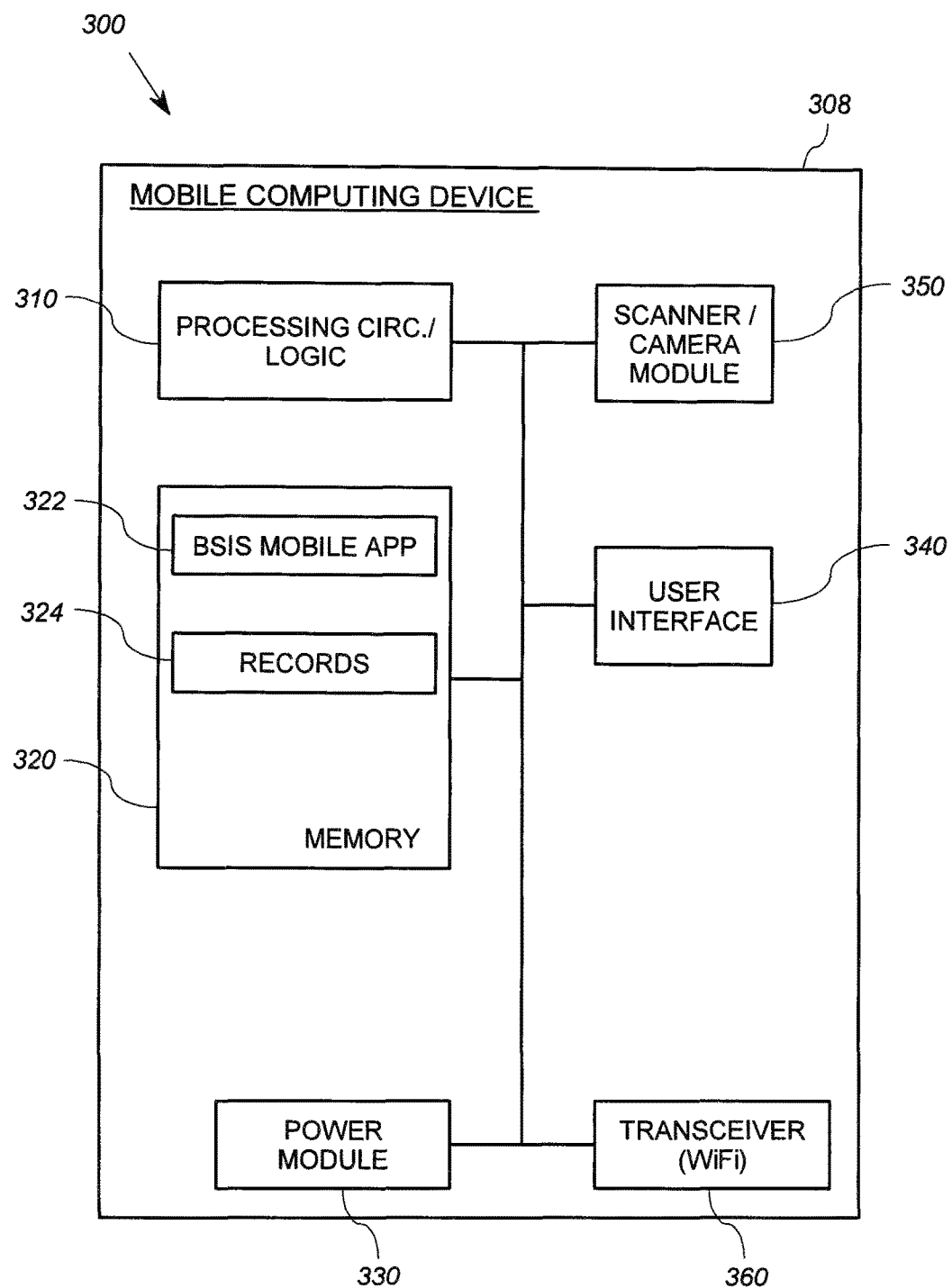
FIG. 5 shows an exemplary internal block diagram of a mobile computing device for the building interface system of FIG. 2.

With reference now to FIG. 5, an internal block diagram of an exemplary mobile computing device 300 is shown. The mobile computing device 300 of FIG. 5 includes a housing, case or the like 308 that is configured in a typical manner for a mobile computing device. The mobile computing device 300 includes processing circuitry/logic 310, a memory 320, a power module 330, a user interface 340, a camera/scanner module 350, and a wireless transceiver 360, all positioned within the housing. It will be appreciated by one having ordinary skill in the art that the embodiment of the mobile computing device 300 is only an exemplary embodiment of a mobile computing device configured for communication with the BAS 100 over a wireless network and may include other components not shown to avoid obscuring aspects of the present invention.

The processing circuitry/logic 310 is operative, configured and/or adapted to operate the mobile computing device 300 including the features, functionality, characteristics and/or the like as described herein. To this end, the processing circuit 310 is operably connected to all of the elements of the mobile computing device 300 described below. The processing circuitry/logic 310 is typically under the control of program instructions or programming software or firmware 322 contained in memory 320, explained in further detail below. In addition to storing the instructions 322, the memory also stores data 324 for use by the BAS 100 and/or the BSIS 200.

The mobile computing device 300 also includes a power module 330 that is operative, adapted and/or configured to supply appropriate electricity to the mobile computing device 300 (i.e., the various components of the mobile computing device). The power module 330 is generally DC power supplied by a battery or batteries.

The wireless computing device 300 further includes a user interface 340. The user interface 340 allows the mobile computing device 300 to present information to the user, and also allows the user to insert data into the mobile computing device 300. Accordingly, the user interface 340 may be configured to drive a touchscreen, keypad, buttons, speaker, microphone, or any of various other standard user interface devices.

A camera/scanner module 350 is also provided in the mobile computing device 300. The camera/scanner module 350 is configured to read the building information indicia 260 provided by the system enrollment/display device 250. Thus, for example, the camera/scanner module 350 may include a camera configured to focus on the building information indicia 260 and produce an electronic data file of the image (e.g., a JPEG file). Alternatively, the camera/scanner module 350 may include a bar code reader or other indicia reader configured to read the building information indicia and generate an associated electronic data file for the indicia.

The electronic data file generated by the camera/scanner module 340 is stored in memory 320. The processing circuit/logic 310 is configured to process the electronic data file generated by the camera/scanner module 340 into indicia data to be transmitted via the wireless transceiver 360. The extent of processing of the electronic data file may be limited such that the indicia data to be transmitted by the wireless transceiver 360 includes the complete electronic data file captured by the camera/scanner module 340 (e.g., an entire image of the barcode in a JPEG file). In this case, subsequent processing will be performed on the indicia data in order for the BAS to determine the unique identifier associated with the indicia data. Alternatively, more involved processing of the electronic data file may be performed by the mobile computing device before the indicia data is transmitted by the wireless transceiver 360. For example, the processing circuitry/logic 310 may be configured to generate a bar code number or other unique identifier associated with the building information indicia captured by the mobile computing device 300. In this case, only the unique identifier may be transmitted as indicia data via the wireless transceiver 360.

The transceiver 360 is configured to communicate with the WAN 55 via the wireless access point 230. This communication includes the transmission of indicia data and other data from the mobile computing device 300 to the BAS 100. This communication also involves the receipt of data from the BAS 100 to the mobile computing device 300. The transceiver is configured to communicate according to the same protocol as the wireless access point 230. As discussed previously, such protocols may include those using IEEE 802.11 standards, such as WiFi, Bluetooth® or ZigBee® protocols.

The memory 320 includes various programs that may be executed by the processor 310. In particular, the memory 320 in the mobile communications device 300 of FIG. 5 includes a BSIS mobile application 322. The BSIS mobile application 322 is configured to facilitate advanced interactions between a human user in possession of the mobile communications device and the building automation system 100. To this end, the BSIS mobile application 322 is configured to read a PWHL within the building and generate indicia data from the read PWHL. The BSIS mobile application 322 is further configured to transmit the indicia data and user identification data unique to the mobile computing device to the BAS 100 via the wireless server 230 (see FIGS. 1-3). The BSIS mobile application is also configured to receive data from the BAS 100 and display the data on the screen 304 of the mobile computing device 300 via the user interface 340. Operation of the BSIS mobile application will be explained in further detail below with reference to FIGS. 6-12.

In addition to the instructions 322, the memory 320 of the mobile computing device 300 also includes data. The data includes records 324 of current and historical data related to operation of the mobile computing device 300. For example, the records 324 may include user identification information that identifies the mobile computing device 300 when transmitting data over the WAN 55. The records 324 may also include current and historical PWHLs scanned by the mobile computing device 300 and related energy consumption or temperature date for various rooms within the building 99 associated with such PWHLs. The records 324 in the memory 320 may also include, for example, data received from the BAS related to one or more pieces of equipment within the building 99.

BSIS Operation

Figure 6:
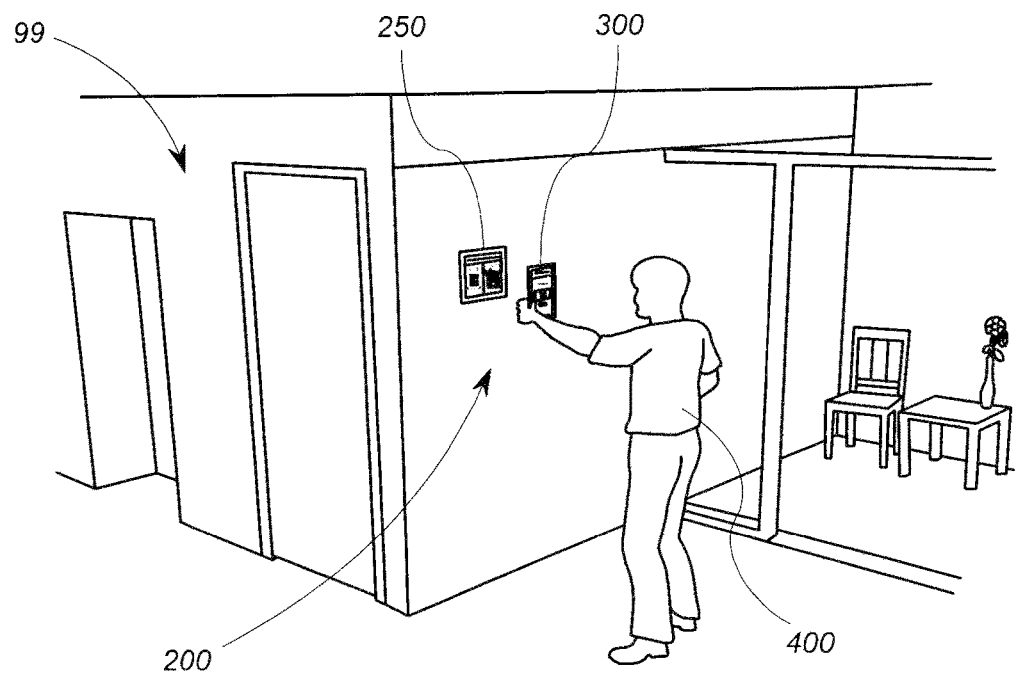
FIG. 6 illustrates a human user utilizing the mobile computing device of FIG. 5 to read building information indicia provided by the system enrollment/display device of FIG. 4 mounted on a wall of the building.
Figure 7:
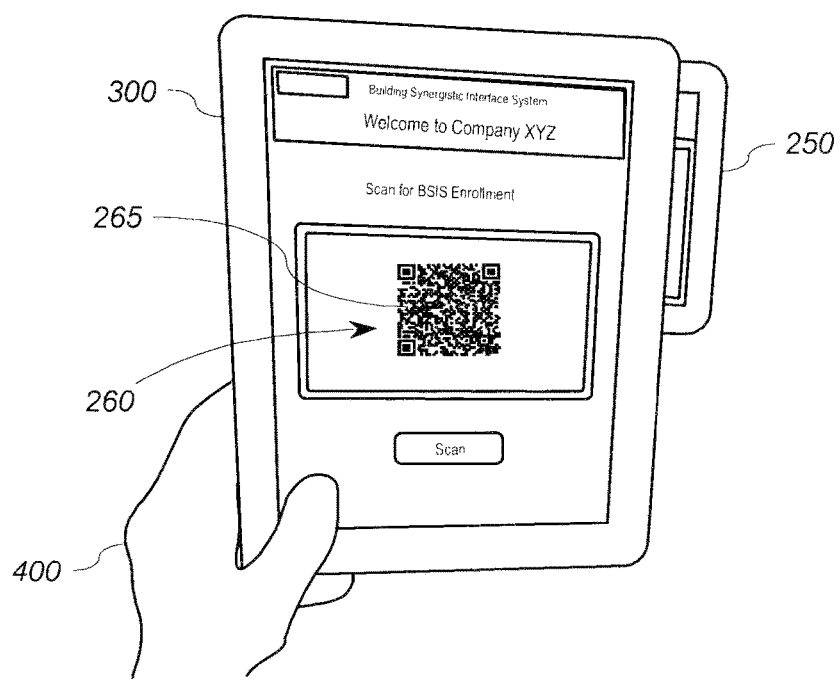
FIG. 7 illustrates an exemplary front view of the mobile computing device when reading building information indicia as shown in FIG. 6.

With reference now to FIGS. 6 and 7, a human user 400 is shown in a foyer of a building 99 equipped with a BSIS 200. The user 400 is in the possession of a mobile computing device 300. Prior to visiting the building site, the user 400 downloaded the BSIS mobile application 322 to the mobile computing device 300. For example, the user 400 may first download the BSIS mobile application 322 from the BAS 100 (or other Internet accessible website storage) to a standard personal computer connected to the Internet; and then download the BSIS mobile application 322 to the mobile computing device 300 using a universal serial bus (USB) connection or other standard peripheral interface connection. Alternatively, if the mobile computing device 300 has a connection to the Internet, such as a connection through a cellular telephone network (or a WiFi connection to the Internet), the user 400 may download the BSIS mobile application 322 when arriving at the building.

With the BSIS mobile application 322 provided on the mobile computing device, the user approaches the system enrollment/display device 250 which is fixed to a particular location in the building 99, such as the foyer wall. Alternatively, the system enrollment/display device 250 may be located outside of the building at a building entrance. A PWHL 260 is displayed on the screen 255 of the system enrollment/display device 250 in the form of a 2D barcode 265. The user 400 holds the mobile computing device 300 up to the system enrollment/display device 250 and focuses on the 2D barcode 265. The user then reads the PWHL by obtaining an image of the 2D barcode 265 with the camera 350. Alternatively, if the mobile computing device 300 does not include a camera, the user may utilize a scanner or other device to read the 2D barcode 265. Because the system enrollment/display device 250 is a dynamic device in the embodiment of FIGS. 6 and 7, the 2D barcode is updated periodically. These updates may occur with time (e.g., every second) or using some other criteria (e.g., after each reading of the 2D barcode).

The BSIS mobile application 322 on the mobile computing device 300 takes the image of the PWHL 260 obtained by the camera 350 and generates indicia data from the read PWHL. The indicia data includes building location data derived from the PWHL image. For example, the building location data may indicate that the PWHL is in the front foyer of the building. The indicia data derived from the PWHL may also include a network address for use by the BSIS mobile application 322. After deriving this information from the read PWHL 260, the mobile computing device 300 transmits the indicia data to the indicated network address. When the mobile computing device 300 transmits this information, it also transmits user identification data that is unique to the mobile computing device 300. This unique identification data may be, for example, a communications address for the mobile computing device 300, or some additional unique identifier. The unique identification data allows the BSIS building application 146 to determine the particular user/mobile computing device 300 within the building that transmitted the indicia data.

The data transmitted by the mobile computing device 300 is received at the wireless access point 230 in the network 50. For example, as shown in FIG. 3, the wireless access point 230 may be a WiFi server associated with a field panel 106b. The data is then forwarded on to the processing circuitry 122 executing the BSIS building application 146. The BSIS building application 146 logs the user into the BSIS 200 using the unique identification data from the mobile computing device 300 and notes the current location of the user (e.g., front lobby). At this time, a two way communication link between the BAS 100 and the mobile computing device 300 is established, as the BAS 100 has a network address for the mobile computing device 300, and the mobile computing device has a network address for the BAS 100 (i.e., the network address derived from the PWHL).

When the BSIS building application 146 logs a new user into the BSIS, the user is given a user ID and associated with a user profile in the user database 162. The user profile may be a generic user profile (i.e., a "public user profile") or a specific user profile (i.e., a "private user profile"), depending on the user. Those users who frequent the building 99 and are registered with the BSIS 200 will have a private user profile that identifies various user environmental preferences and security clearances for the user. For example, a first user, Chris 1234, may have a user profile that indicates a temperature preference of 70°, a lighting preference of 90%, and a level 3 security clearance. In addition, the user profile may also indicate various other preferences and clearances, such as a soundtrack preference of "waves" or "jazz", and restricted rooms within the building where Chris 1234 is allowed to enter.

Those users who do not frequently visit the building 99 or are members of the general public may be associated with a public user profile. The public user profile assigns the most common environmental preferences and only a general public security clearance to the user. For example, the public user profile may associate the user with a temperature preference of 72°, and only grant the user with a public level security clearance such that the user is only allowed access to the public areas within the building 99.

Users with public user profiles are not allowed to change their user profile within the BSIS. On the other hand, users with private user profiles may be permitted to change certain preferences in their profiles. This may be accomplished by an option on the mobile computing device 300 that allows the user to "change profile". Alternatively, in some BSIS arrangements, only an administrator is permitted to change the user profiles.

After the user is logged into the BSIS 200, the BSIS building application 146 acts to (i) provide the user with building information data, and (ii) automatically control various building parameters based on the presence of the user within the building 99. Upon logging a new user into the BSIS 200, the BSIS building application 200 transmits certain building data to the user's mobile computing device 300, based on the user's profile. This building data may include a welcome message and instructions for using the BSIS 200. The building data may also include various other pieces of information about the building 99. In one typical embodiment, when the user logs into the BSIS 200, the BSIS building application 146 retrieves building layout data from the room database 158, and transmits the building layout data to the user. In addition, the BSIS building application 146 also transmits user location data based on the particular PWHL just scanned by the user. As discussed previously, each PWHL is associated with a particular room or area within the building 99, so the BSIS building application can determine the user location within the building based on the scanned PWHL.

Figure 8:
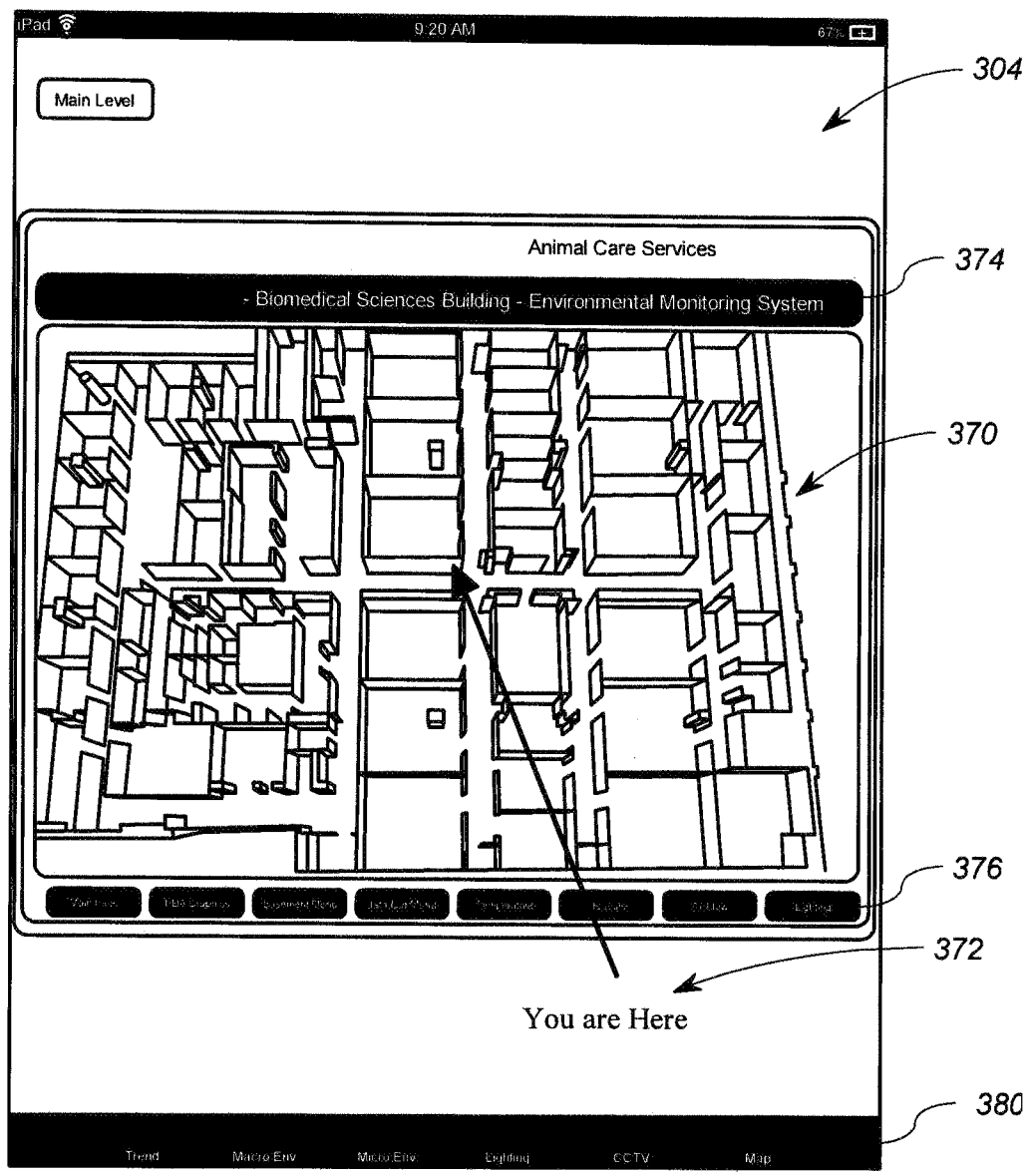
FIG. 8 shows an exemplary screen shot of the mobile computing device of FIG. 5 displaying a building map provided via the building interface system.

When the building layout data and the user location data are received at the mobile computing device 300, the BSIS mobile application 322 uses the data to present a map on the screen 304 of the mobile computing device 300. An exemplary map 370 on the screen 304 of the mobile computing device is shown in FIG. 8. The BSIS mobile application 322 may be configured to display the map 370 automatically upon receipt of the building layout data, or only after the user selects a "map" option from a menu bar 380.

In the embodiment of FIG. 8, the map 370 shows various rooms and passages within the building 99, and also includes a present location marker 372. The map 370 may include a header 374 that identifies the building by name. In addition, the map 370 may include a map menu bar 376 that allows the user to view related maps for the building. For example, if the building is a multi-story building, the user may have the option of viewing different floors in the building. The various rooms and passages on the map 370 may or may not be identified by text to help the user find other building locations. Additionally, depending on the user profile, the map menu bar 376 may allow the user to view alternative maps and data, such as current lighting conditions or temperature in various rooms, air flow ducts within the building, etc.

Figure 9:
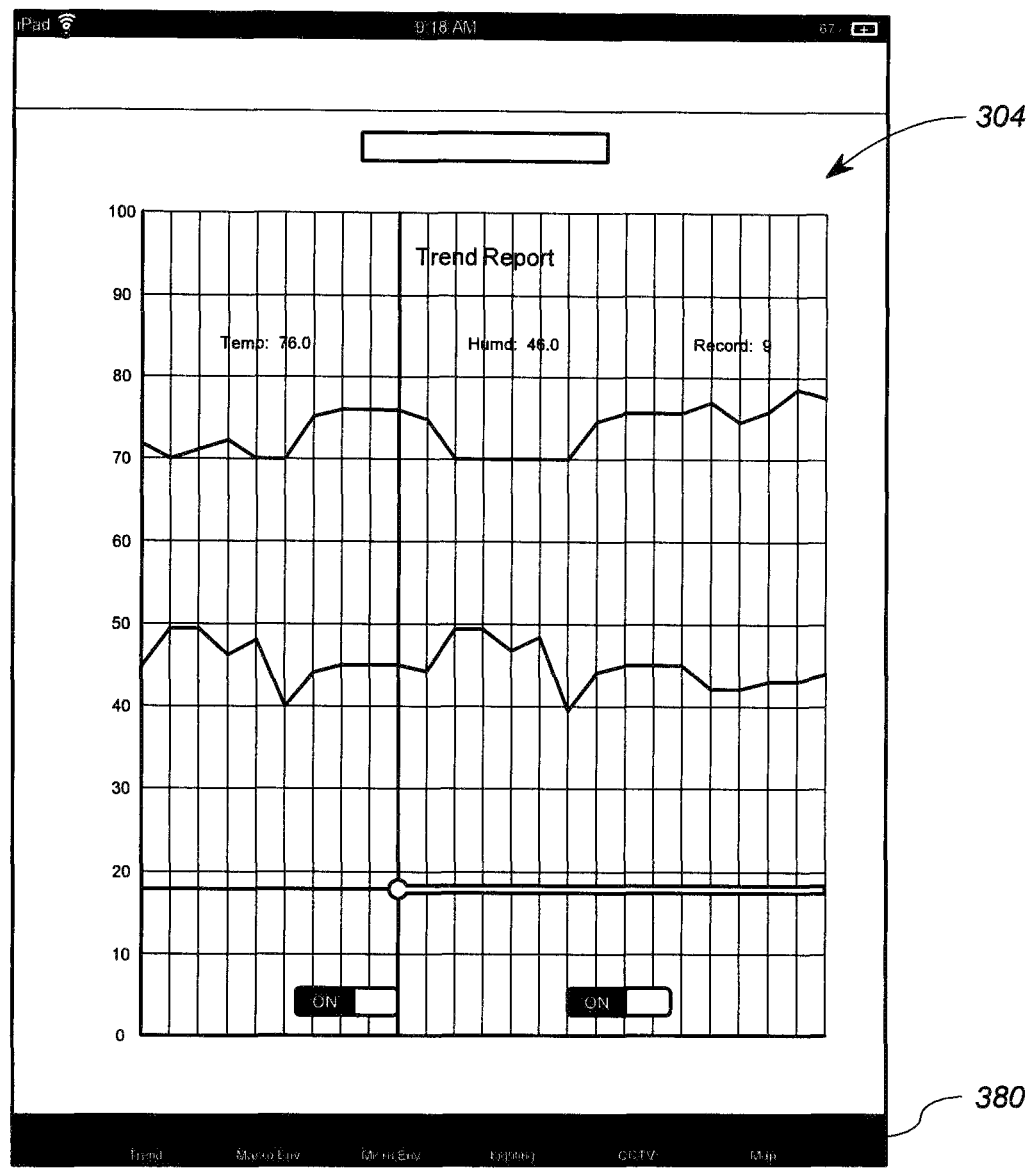
FIG. 9 shows an exemplary screen shot of the mobile computing device of FIG. 5 displaying building environmental parameter data provided via the building interface system.

The menu bar 380 displayed by the BSIS mobile application 322 also provides the user with options in addition to the "map" option. These options may also be dependent upon the user profile, such that only authorized users are given access to certain data options. For example, the menu bar 380 may provide the option to view the video output from various closed circuit televisions within the building. As another example, the menu bar 380 may provide the option to view energy consumption data and related reports for the building or a particular room of the building. An example of a screen of the mobile computing device 300 providing the user with a trend report is shown in FIG. 9. In one implementation, the BSIS mobile application 322 causes the user interface 340 to display this trend report on the screen 304 when the user selects the "trend" button on the menu bar 380. In this implementation, the trend report as depicted in FIG. 9 shows the user temperature and humidity measurements within the building or a room in the building at various times during the day, along with an average temperature and humidity reading for the day.

As mentioned above, the BSIS building application 146 is not only configured to provide building data to the mobile computing device 300, but is also configured to automatically control various building parameters of the BAS 100 based on the presence of the user within the building. Thus, if the BSIS 200 is used in association with an environmental control system configured to control various environmental conditions within a building, such as temperature, lighting, humidity, etc., the BSIS building application will attempt to control the BAS 100 to meet user's preferences as contained in the user database 162. For example, if the user database indicates that the user prefers a temperature of 70°, the BSIS building application 146 will attempt to bring the room where the user is located to 70°. This may be accomplished by the BSIS building application 146 interacting with the BAS application 144 to send control signals to various environmental control devices within the building. Example environmental control devices include thermostats, dampers, lights, speakers, and various other field devices as will be recognized by those of skill in the art.

It will be recognized that in many circumstances, multiple users with different user profiles will be located in the same room. In these situations, the BSIS building application 146 may be equipped with appropriate conflict resolution routines. For example, a first user in a room may prefer a temperature of 68° while a second user in a room may prefer a temperature of 74°. This conflict may be simply resolved by the BSIS building application 144 by setting the room temperature to the average preferred temperature of 71°. As a result, each user in a room has an effect on the actual temperature in a room. Other conflict resolution strategies and processes are possible in addition to average control strategies. For example, other conflict resolution strategies may include the use of default conditions, median conditions, average conditions for a limited number of users in a room, preferred users trumping non-preferred users based on status, or various other strategies. When a room is no longer occupied, the BAS controls the system to default (unoccupied) conditions.

The BSIS building application 146 is configured to track each user's location in the building 99. This is possible because PWHLs 260 are mounted at numerous locations throughout the building 99, and the PWHLs are associated with different rooms in the building by virtue of being displayed in close proximity to the room (e.g., inside the room or outside a doorway to the room). As mentioned previously, these PWHLs 260 may be either static (e.g., printed) or dynamic (e.g., presented on a screen). Each time the user moves to a new room within the building 99, the user reads the PWHL 260 associated with that room with his or her mobile computing device 300 and indicia data related to the PWHL is automatically transmitted to the BSIS building application 146. This informs the BSIS building application 146 of the user's new location in the building, in the same manner discussed above with reference to FIGS. 6 and 7. In this manner, the BSIS building application 146 is able to track a user's location within the building, by associating the user with the location associated with the most recently scanned PWHL 260.

As the user moves to new locations within the building, the BSIS building application 146 attempts to control the BAS 100 to meet the user profile for each user, considering various conflict resolution strategies as described above. As explained above, if the BAS 100 is an environmental control system, the BAS may control field devices configured to control temperature, lighting, sound, etc. If the BAS 100 is a security system, the BAS may control door locks and other field devices to allow the user to enter certain restricted rooms, depending on the user profile. If the BAS 100 is a mass notification system, the BAS may send alarms or other warnings to users when a building event occurs (e.g., fire alarm/evacuation order for floors 8-10).

Each time the user scans a new PWHL with his or her mobile computing device 300, the BSIS associates the user with the new location and also transmits new building data to the user about their surroundings. Again, the building data transmitted to the user is based on the user profile and related clearance level. This building data may include a map with the current user location, information related to energy usage in the new area, temperature and humidity in the new area, building systems in the new area, etc.

In at least one alternative embodiment of the BSIS 200, certain PWHLs 260 in the building 99 are associated with building equipment in addition to or instead of an association with a building location. The building equipment may include field devices, manufacturing equipment, testing equipment, or other equipment located within the building. Examples of such equipment include such diverse components as HVAC components such as dampers in air ducts, robots and other manufacturing equipment, and centrifuges and other laboratory testing equipment. In this embodiment, PWHLs are mounted on various pieces of equipment within the building, and the BSIS 200 is configured to provide the user with data related to the various pieces of equipment.

Figure 10:
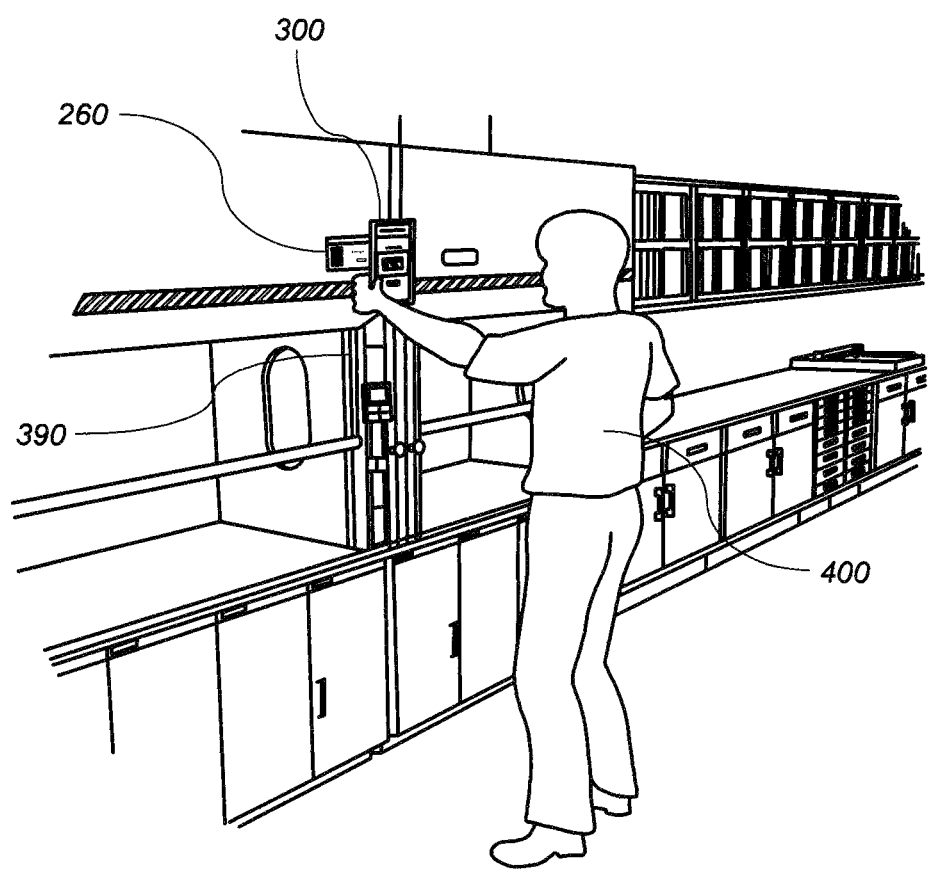
FIG. 10 illustrates a human user utilizing the mobile computing device of FIG. 5 to read building information indicia mounted on building equipment.

FIG. 10 shows a user 400 scanning a static PWHL 260 associated with a laboratory testing device 390. Indicia data from the PWHL 260 scanned by the user's mobile computing device 300 is automatically transmitted to the BSIS building application 146. This not only identifies the particular laboratory testing device 390 in front of the user, but also identifies the user's new location within the building (i.e., the location where the equipment 390 is located). Upon receipt of the indicia data from the user, the BSIS building application 146 transmits new building information related to the piece of equipment in front of the user. This building information may include any of various different types of information such as specific hazard information (e.g., "CAUTION: combustible gas may be in this area"), diagrams or indicative of the construction of the equipment (e.g., electrical schematics), instructions related to the operation of the equipment (e.g., a user's manual), or history related to maintenance of the equipment (e.g., "last air filter replacement: 01/02/11"). Accordingly, the BSIS 200 provides the user 400 with immediate access to diagrams and other data related to a piece of equipment when the user scans the PWHL associated with the equipment. The user simply selects the desired data from a menu provided to the user on the mobile computing device 300, and the BSIS 200 downloads the requested data to the user. This data can be helpful to the user in more efficiently learning about, working with, repairing, or performing maintenance on a piece of equipment.

Figure 11:
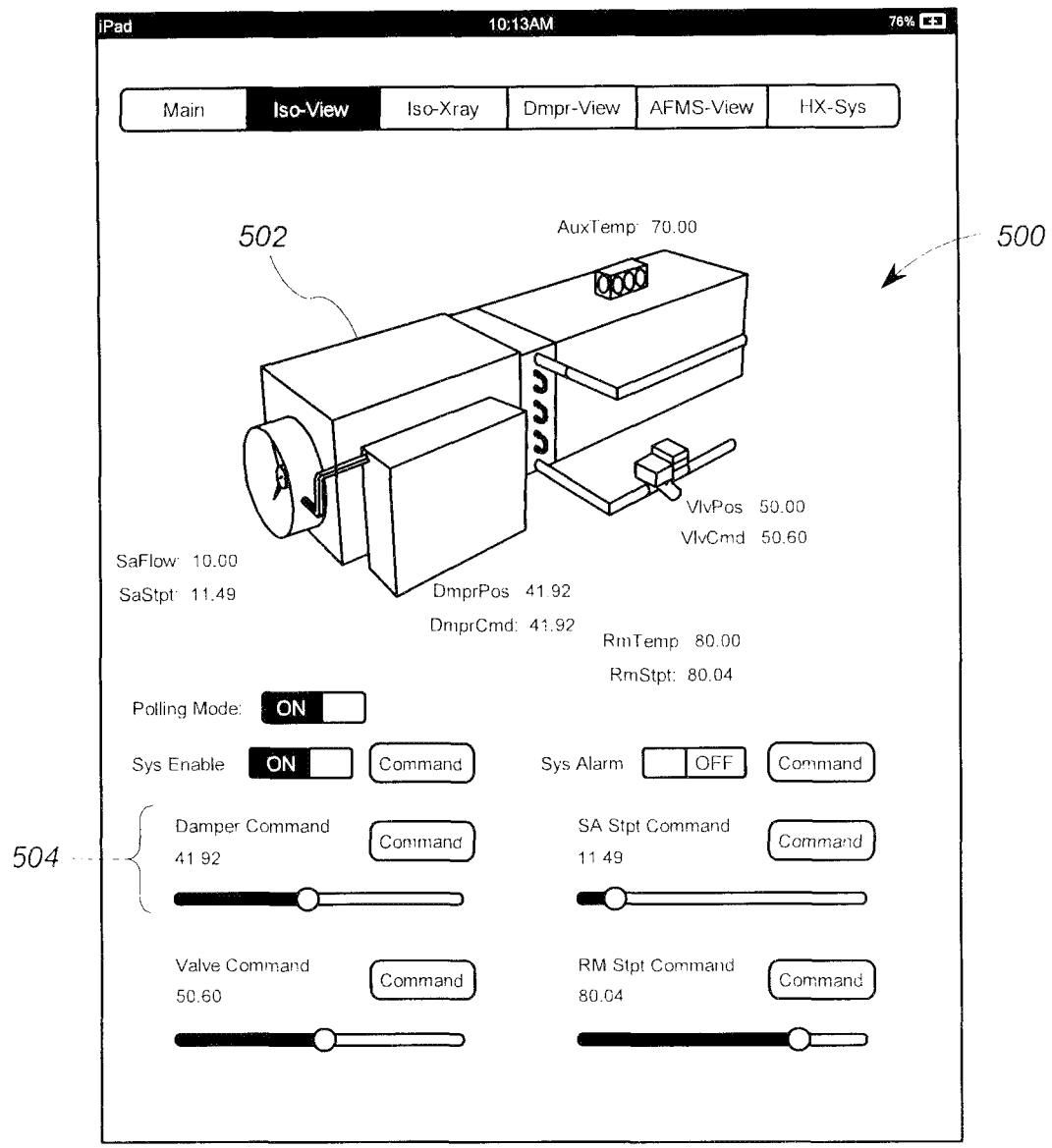
FIG. 11 shows an exemplary screen shot of the mobile computing device of FIG. 5 displaying equipment data provided via the building interface system.

In addition to receiving information about a piece of equipment through the BSIS 200, the user may also input equipment data into to the BSIS 200. For example, data concerning desired operational parameters, maintenance, equipment layout, etc., may all be input into the BSIS 200 for a particular piece of equipment via the mobile computing device 300. FIG. 11 shows an exemplary screen shot 500 generated by BSIS mobile application 322 of a mobile computing device 300 that scanned a PWHL associated with an air handling unit in accordance with techniques described herein. The screen shot 500 shows a perspective view diagram of the air handling unit (AHU) 502, and the current operating parameters of the AHU. For example, the screen shot 500 includes a damper parameter 504, indicating that the damper is currently being operated at "41.92" (e.g., the damper is 41.92% open). The BSIS mobile application 322 of the mobile computing device 300 enables a user presented with this screen to change the operating parameters of the damper by adjusting the damper parameter 504. The BSIS mobile application 322 also enables other various operational parameters to be adjusted by the user in a similar manner. Additionally, the screen 500 may include options for the user to allow the user to input maintenance records to the BSIS mobile application 322 for the AHU. Thus, if the user just changed an air filter for the AHU, the user may select an option on the screen 500 as presented by the BSIS mobile application 322 that allows the user to prompt the BSIS mobile application to transmit this information via the transceiver 360 to the BSIS building application 146 for storage in the equipment database 164. The options for a user to adjust operating parameters, maintenance records, or provide any other system inputs may be based on the access level associated with the user in the user database 162. Accordingly, public users may have no ability or options for inputting data, while users with the highest level access may have the ability to change operating parameters and input maintenance records for equipment throughout the building.

BSIS Building App Process Flow

Figure 12A:
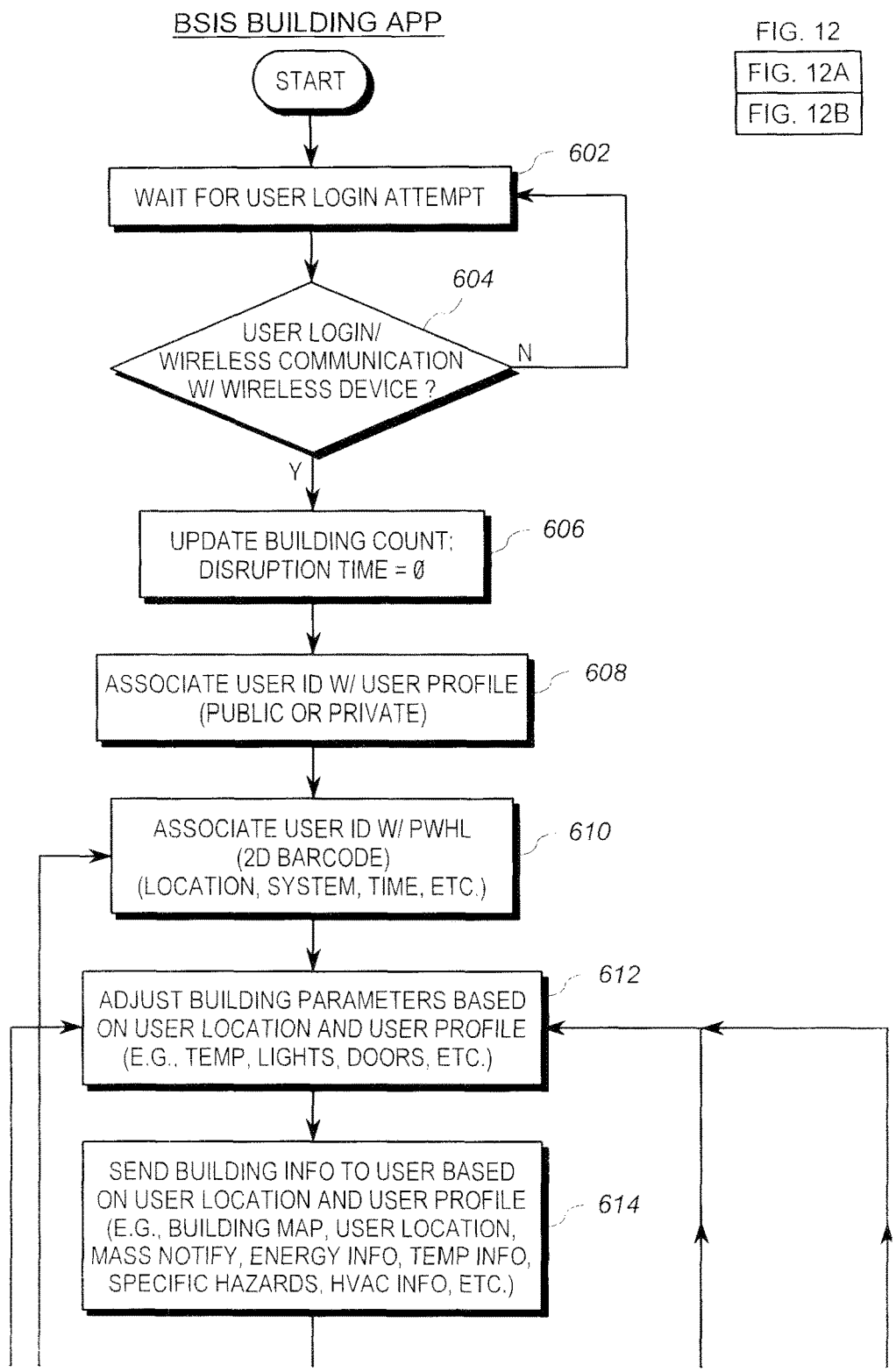
FIG. 12 depicts an exemplary process flow for a building interface system building application contained in the field panel of FIG. 3.
Figure 12B:
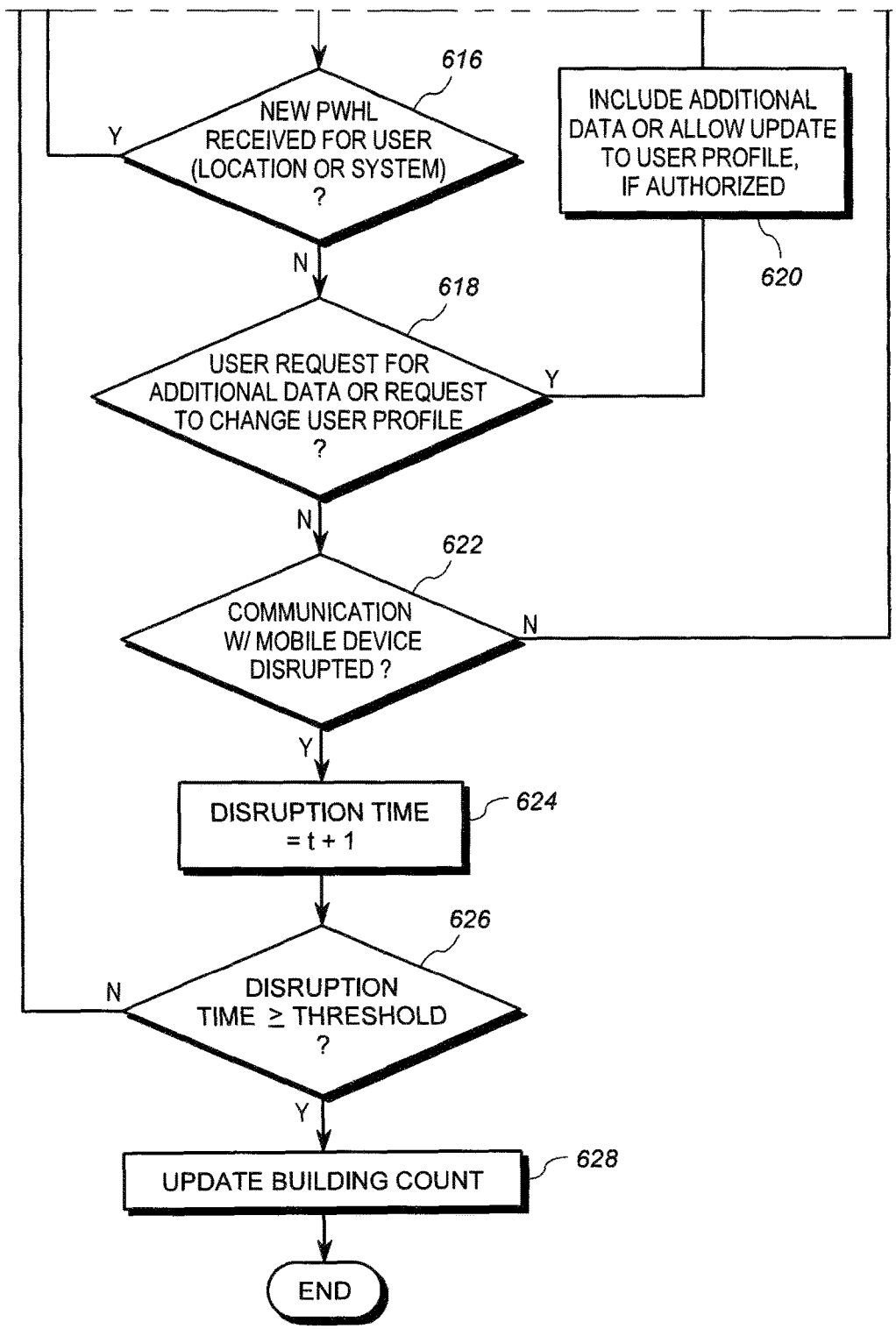

Referring now to FIG. 12, an exemplary process flow performed by the BSIS building application 146 is shown for interacting with a user within the building 99. The process begins with step 602, where the BSIS building application 146 waits for a new user to attempt to login to the BSIS 200. In step 604, the BSIS building application 146 of the system 200 determines whether a user has transmitted the indicia data for a PWHL 260 to the system along with an address for the mobile computing device that scanned the PWHL. If not, the BSIS building application 146 of the system returns again to step 602 and continues to wait for new user login information. If new indicia data for a PWHL has been received, the BSIS building application 146 proceeds to step 606 and updates a building count to indicate that a new user has entered the building and is attempting to log into the system. A disruption time is set to "0" in step 606, indicating communication between the BSIS building application 146 and the BSIS mobile application 322 has been established.

In step 608, the BSIS building application 146 assigns the address of the mobile computing device that transmitted the indicia data a user ID, and associates the user ID with a user profile from the user database 162 (see FIG. 3). As discussed previously, the user profile may be a public user profile or a private user profile that is unique to the user. The user profiles provide the BSIS with user environmental preferences, security clearances and related user information.

In step 610, the BSIS building application 146 completes the user login process by associating the user ID with the PWHL that was scanned by the user. In particular, the user database is updated to associate the user ID with the room where the PWHL was scanned. The user database may also be updated to include other information derived from the scanned PWHL by the BSIS mobile application 322 that transmitted the PWHL or by the BSIS building application 146; such other derived information may include time of day or a particular piece of equipment or system that is also associated with the PWHL.

In step 612, the BSIS building application 146 interacts with the BAS to adjust building parameters based on the user location and preferences in the user database. For example, if the BAS is an environmental control system, control signals may be sent from the field panel (see 106b in FIG. 3) to field devices to adjust room temperature, lighting, and other environmental conditions based on the user preferences and conflict resolution procedures, as discussed above. If the BAS is a security system, doors may be unlocked to allow access to the building or rooms within the building.

In step 614, the BSIS building application 146 sends building information to the user's mobile computing device 300. Example building information includes building layout data, user location data, mass notification alarms, energy consumption information, room temperature information, specific hazards, etc. As discussed above, the building information sent to the user is based on the user's location within the building and the user profile. Therefore, different users will receive different building information at different times, based on their location and user profile.

In step 616, the BSIS building application 146 determines whether new indicia data from a different PWHL has been received from the same user. If new indicia data has been received, the application returns to step 610 and updates the user database to associate the user with the new PWHL data (i.e., a new building location and/or new equipment within the building). If new indicia data has not been received from the user, the application continues processing at step 618.

In step 618, the application 146 determines whether the user has sent (via the BSIS mobile application 322 of the mobile computing device 300) a request for additional building information, or a request to update a BSIS database (e.g., the user database or the equipment database). Requests for additional building information may be requests generated by the user selecting specific building information options offered to the user on a menu presented on the user's mobile computing device 300, as discussed above. Requests to update the database are similarly made by selecting certain menu options from the user's mobile computing device 300. One such menu option presented on screen 304 by the BSIS mobile application 322 of the mobile computing device 300 allows certain users to update the user database by changing their user profile to indicate different user environmental preferences. Another menu option provided by the BSIS mobile application 322 of the mobile computing device 300 allows certain users to update the equipment database to indicate changes in equipment within the building, such as reports of maintenance performed on specific pieces of equipment. If the user has submitted a request for additional data or to update a database, the application 146 continues processing at step 620 and retrieves the requested information for the user, or updates the database requested by the user. Thereafter, the application 146 returns to step 612 and adjusts the building parameters (e.g., environmental parameters), and sends the newly requested building or equipment information to the user's mobile computing device 300.

In step 622, the BSIS building application 146 determines whether communications with the user's mobile computing device 300 are ongoing. This may be determined by confirming that messages have been received from the mobile computing device 300 within a predetermined period of time. If messages have not been received from the mobile computing device within the predetermined period of time, the BSIS building application 146 may send a "where is" message to the mobile computing device 300 requesting confirmation that the "where is" message was received by the mobile computing device.

If it is determined in step 622 that the BSIS building application 146 remains in communication with the user's mobile computing device 300, the application returns to step 612 and continues to adjust the building parameters and provide information to the user based on the user's location and user profile. However, if it is determined in step 622 that communications with the mobile computing device 300 have been disrupted, the application continues processing at step 624 and increments a disruption time count.

In step 626, the BSIS building application 146 determines whether the disruption time is greater than a threshold time. If not, the application returns to step 610 and continues to adjust the building parameters and provide information to the user based on the user's last known location and user profile. However, if the disruption time is greater than a threshold time in step 626, the application 146 determines that communications with the user's mobile computing device have been lost, and assumes that the user has left the building. At this point, the application continues processing at step 628 and decrements the building count by one user. At this time the user is logged out of the BSIS 200, and the BSIS does not make any further adjustments to the building parameters based on the user's user profile until the user logs into the system again.

BSIS Mobile App Process Flow

Figure 13A:
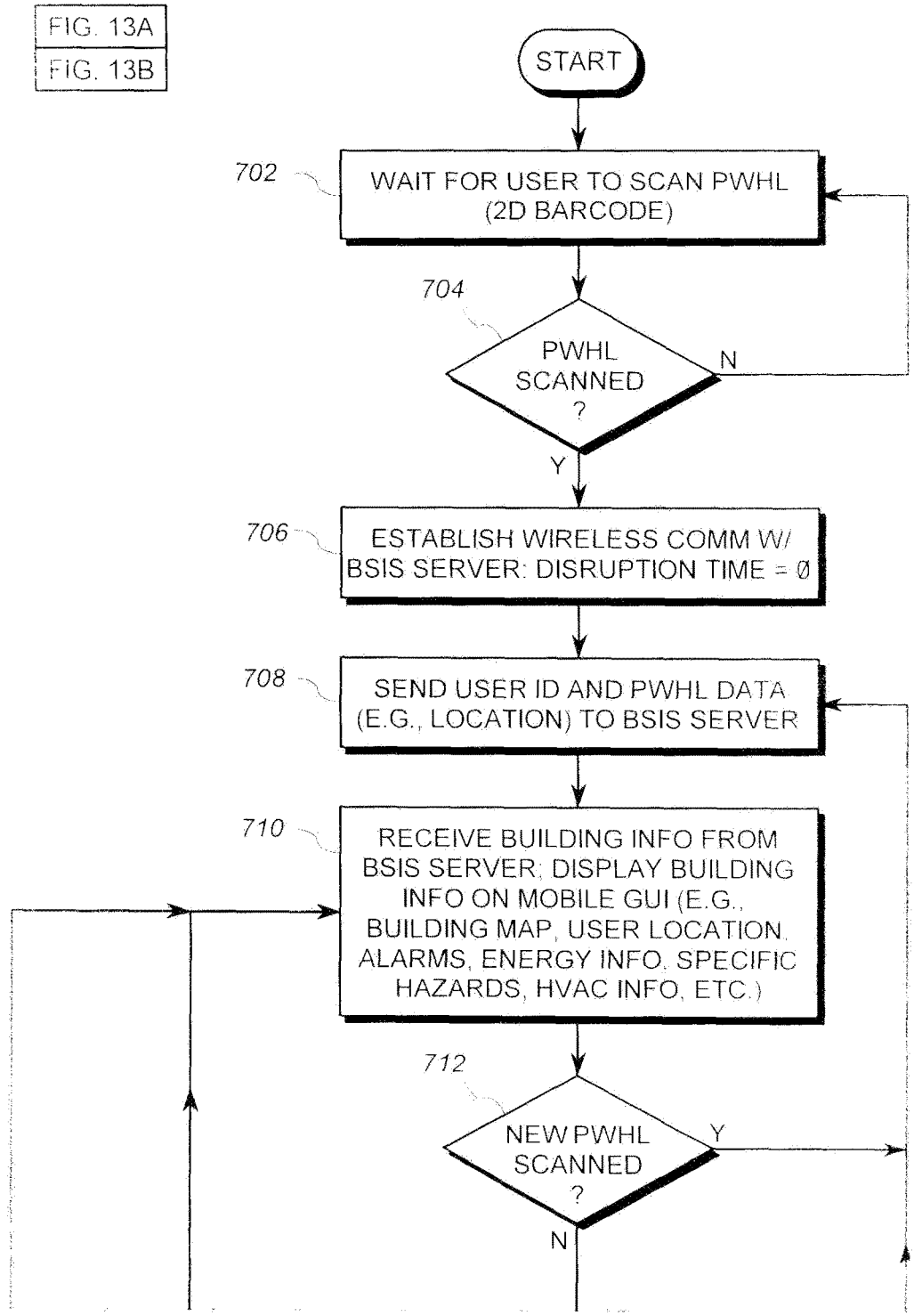
FIG. 13 depicts an exemplary process flow for a building interface system mobile application contained in the mobile computing device of FIG. 5.
Figure 13B:
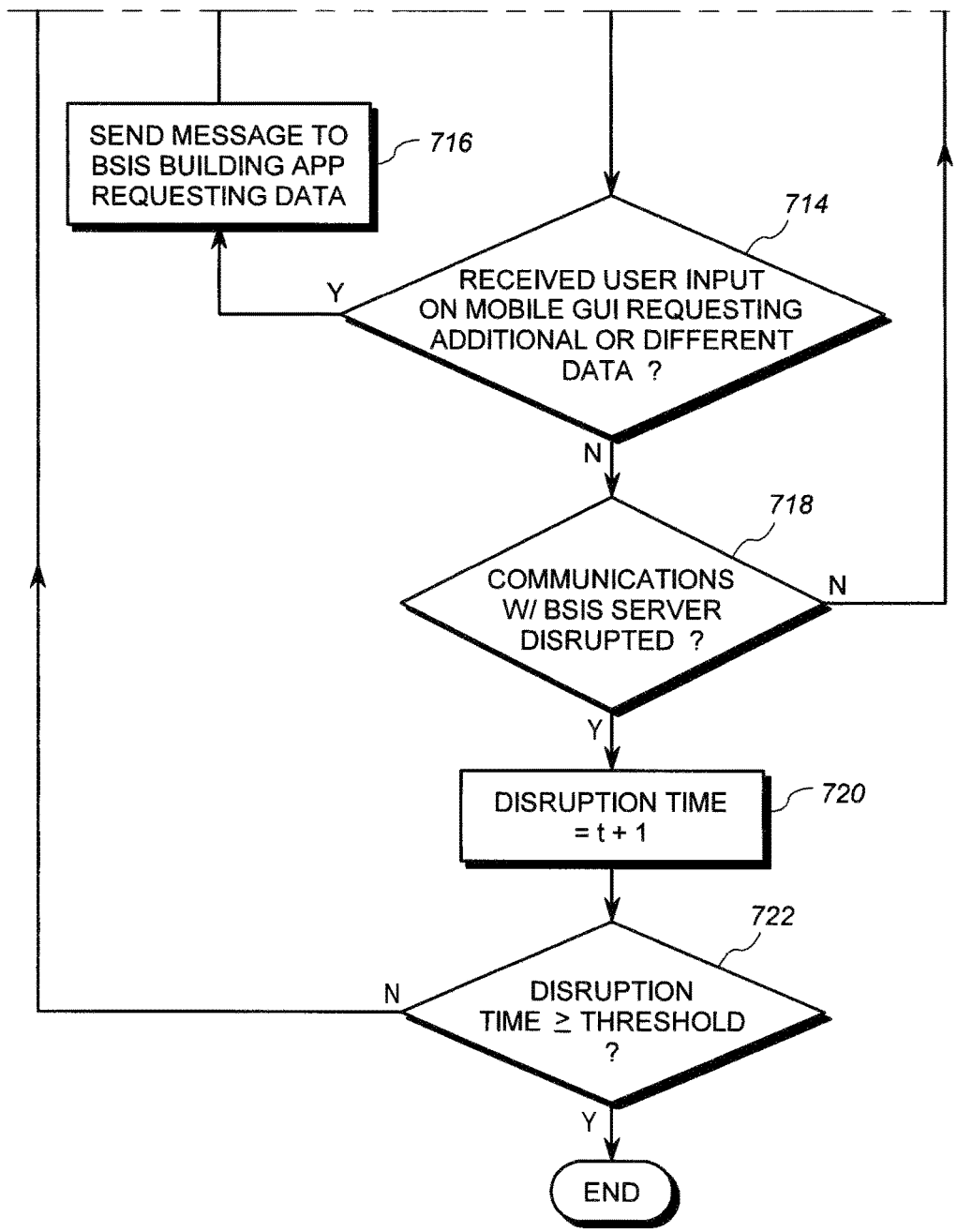

With reference now to FIG. 13 an exemplary process flow performed by the BSIS mobile application 322 is shown. The process begins with step 702, where the BSIS mobile application 322 waits for the user to scan a PWHL using the camera (or other reader) of the mobile computing device 300. In step 704, the BSIS mobile application 322 determines whether the user has scanned a PWHL. If not, the BSIS mobile application 322 returns to step 702 and continues to wait for the user to attempt login to the system by scanning a PWHL.

If it is determined that the user has scanned a PWHL in step 704, the BSIS mobile application 322 moves to step 706 and establishes a wireless communication channel with the BSIS building application 146 via the wireless server 230. A disruption time is set to "0" in step 706, indicating communication between the BSIS building application 146 and the BSIS mobile application 322 has been established.

In step 708, the BSIS mobile application 322 decodes the PWHL scanned by the user and generates indicia data based on the scanned PWHL. The BSIS mobile application 322 then transmits this PWHL data to the BSIS server 230.

In step 710, the BSIS mobile application 322 waits to receive building information from the BSIS server 230. After receiving building information from the BSIS server, the application 322 displays the building information on the screen 304 of the mobile computing device 300. As discussed previously, example building information includes building layout data, user location data, mass notification alarms, energy consumption information, room temperature information, specific hazards, etc. The building information sent to the user is based on the PWHL data and the user profile in the BSIS. Therefore, different users will receive different building information at different times, based on their location and user profile.

In step 712, the BSIS mobile application 322 determines whether the user has scanned a new PWHL with the mobile computing device 300. If so, the application returns to step 708 and sends indicia data to the BSIS server 230 based on the newly scanned PWHL. If not, the application 322 proceeds to step 714.

In step 714, the BSIS mobile application 322 determines whether the user has used the graphical user interface on the mobile computing device 300 to request additional building information or request an update to a BSIS database (e.g., the user database or the equipment database). Requests for additional building information may be requests generated by the user selecting specific building information options offered to the user on a menu presented on the user's mobile computing device 300, as discussed above. Requests to update the database are similarly made by selecting certain menu options from the user's mobile computing device 300. If the user has submitted a request for additional building information or to update a database in step 714, the application next sends the request to the BSIS building application 146 via the BSIS server 230 (step 716). The BSIS mobile application then returns to step 710 and waits to receive building information from the BSIS server. If the user has not submitted a request for additional building information or to update a database in step 714, the application continues processing at step 718.

In step 718, the BSIS mobile application 322 determines whether communications with the BSIS building application 146 are ongoing. This may be determined by confirming that messages have been received from the BSIS building application within a predetermined period of time. If it is determined in step 718 that the BSIS mobile application 322 remains in communication with the BSIS building application 146, the BSIS mobile application returns to step 708. However, if it is determined in step 718 that communications with the BSIS building application 146 have been disrupted, the application moves to step 720 and increments a disruption time count.

In step 722, the BSIS mobile application 322 determines whether the disruption time is greater than a threshold time. If not, the application returns to step 710 and continues to look for further building information from the BSIS building application 146. However, if the disruption time is greater than a threshold time in step 722, the BSIS mobile application 322 determines that communications with the BSIS building application 146 have been lost, and assumes that the user has left the building. At this time the BSIS mobile application 322 is automatically ended until restarted again by the user.

Exemplary BSIS Barcode Scan Scenario

Figure 14A:
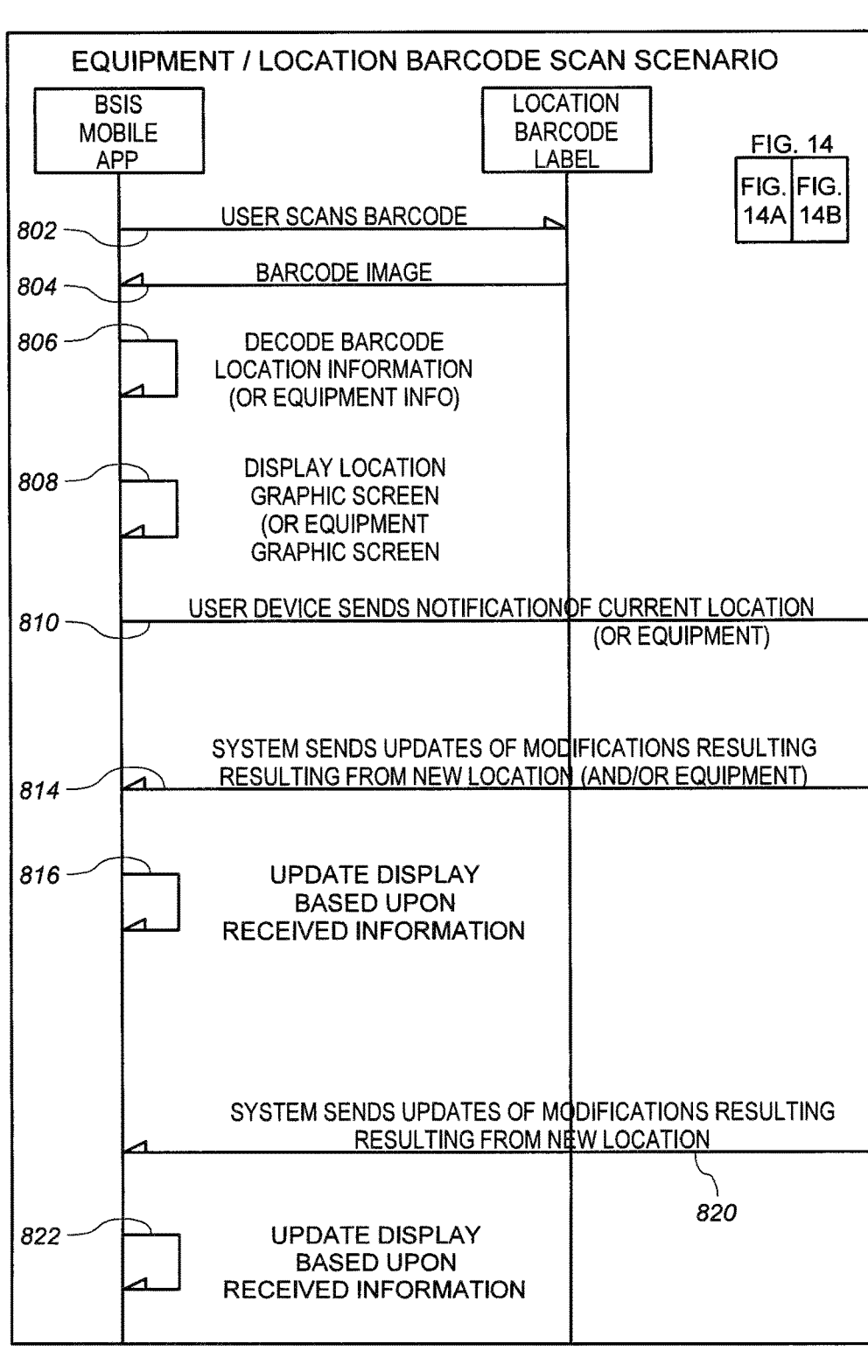
FIG. 14 illustrates interactions between the building interface system building application and the building interface system mobile application for the building interface system of FIG. 1.
Figure 14B:
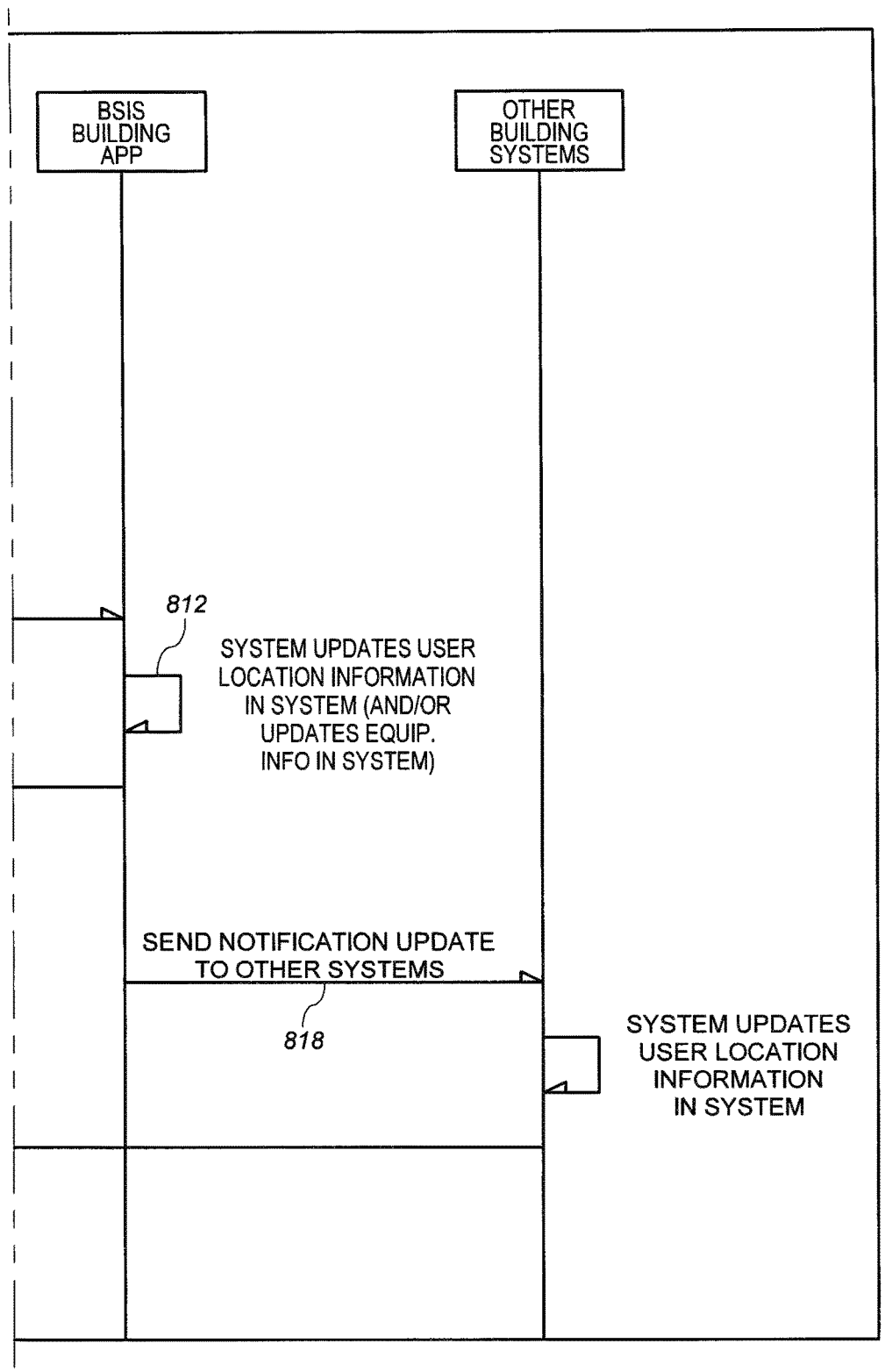

With reference now to FIG. 14 exemplary interactions between the BSIS building application 146 and the BSIS mobile application 322 are illustrated when a user scans a PWHL with a mobile computing device 300. In this illustration, the user begins by using the mobile computing device 300 as described herein to scan a PWHL (e.g., a barcode) at a location in the building where the PWHL is found by the user (as reflected by interaction line 802). The PWHL image is then captured by the mobile computing device 300 (as reflected by interaction line 804) and the BSIS mobile application 322 decodes the PWHL image to determine current location information or current equipment information associated with the PWHL (as reflected by interaction line 806). If the user has previously received building information (e.g., a building map), the mobile computing device 300 may update its display based on the information decoded from the PWHL image (e.g., indicate current location on the building map) as depicted by interaction line 808. The BSIS mobile application then proceeds to send the indicia data decoded from the PWHL image (e.g., current location) to the BSIS building application (as reflected by interaction line 810). The BSIS building application 146 takes the indicia data received from the BSIS mobile application and updates the user database accordingly (e.g., associate the user with the current location in the user database as reflected by interaction line 812). Next, as depicted by interaction line 814, the BSIS building application 146 sends updates and modifications to the BSIS mobile application 322 based on the new user location (e.g., current temperature information at the current location). The BSIS mobile application 322 may then update the screen 304 of the mobile computing device 300 to appropriately display the updates based on the new user location received from the BSIS building application 146 (as reflected by interaction line 816. After this, the BSIS building application 146 sends updates concerning the user location to one or more additional building automation systems in communication with the BSIS (e.g., a mass notification system) as reflected by interaction line 818. These building automation systems also update the user information based on the new building location and send updates to the BSIS mobile application based on the new user location (e.g., warnings from the mass notification system based on the user's location) as depicted by interaction line 820. The BSIS mobile application 322 then updates the screen of the mobile computing device to appropriately display the updates received from the various building automation systems as reflected by interaction line 822.

While each of the applications 144, 146, and 322 are described as being implemented as software executed by processing circuitry 122 or 310 (i.e., as a combination of hardware and software), the embodiments presented may be implemented in hardware alone such as in an application-specific integrated circuit ("ASIC") device.

The foregoing detailed description of one or more embodiments of the Synergistic Interface System for a Building Automation System has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

What is claimed is:

1. An interface system for a building, comprising:
a building control system configured to send control signals to a plurality of field devices within the building; and
at least one building information indicia positioned at a location in the building, the at least one building information indicia defining indicia data, where at least one of the building information indicia enables enrollment of an at least one mobile computing device by creation of a record in a user database of the building control system;
wherein the at least one building information indicia being a physical world hyperlink linking a physical location within the building that is associated with the building information indicia with the at least one mobile computing device that reads the building information indicia and that transmits the indicia data to the building control system;
wherein the building control system is configured to control the field devices based at least in part on the indicia data received from the at least one mobile computing device, wherein the at least one mobile computing device is one of a plurality of mobile computing devices, wherein the interface system further includes the user database associating each of the plurality of mobile computing devices with a respective user profile, wherein the building control system is configured to control the field devices based at least in part on both the indicia data received from one of the plurality of mobile computing devices and the respective user profile from the user database that is accessed by the building control system.

2. The interface system of claim 1, wherein each respective user profile is either a private user profile or a public user profile.

3. The interface system of claim 1, wherein the building information indicia is a first of a plurality of building information indicia positioned at different locations in the building, wherein the indicia data includes building location data.

4. The interface system of claim 3, wherein the building control system includes a building information database, wherein the building information database includes building layout data, wherein the building control system is configured to transmit the building layout data to the at least one mobile computing device after receiving the indicia data from the at least one mobile computing device.

5. The interface system of claim 4, wherein the building control system is further configured to transmit user location data to the mobile computing devices in association with the building layout data, which location data enables the at least one mobile computing device to display a building map and a present location marker on a screen of the at least one mobile computing device based on the building layout data and the user location data received from the building control system.

6. The interface system of claim 3, wherein the indicia data includes equipment identification data, wherein the building control system includes a building information database including equipment operational data associated with the equipment identification data, and wherein the building control system is configured to transmit the equipment operational data to the mobile computing devices after receiving the indicia data from the mobile computing devices.

7. The interface system of claim 6, wherein the at least one mobile computing device is capable of displaying a graphical representation of the equipment associated with the equipment operational data received from the building control system.

8. The interface system of claim 6, wherein:
the building information indicia includes, in addition to the building location data and the equipment identification data, a room parameter detected or tracked by the building control system; and
the room parameter includes at least one parameter selected from the group consisting of a current environmental condition and a security condition.

9. The interface system of claim 3, wherein:
the building information indicia includes, in addition to the building location data, a room parameter detected or tracked by the building control system; and
the room parameter includes at least one parameter selected from the group consisting of a current environmental condition and a security condition.

10. The interface system of claim 1, wherein the building information indicia includes electronic indicia provided on a screen connected to the building, and wherein the electronic indicia is dynamic indicia such that the electronic indicia changes with time.

11. The interface system of claim 1, wherein the at least one mobile computing device is one of a plurality of mobile computing devices, wherein the interface system further comprises a user database associating each of the plurality of mobile computing devices with a building location, and wherein the building control system is a mass notification system configured to transmit messages to selected mobile computing devices based on the building location associated with the selected mobile computing devices.

12. The interface system of claim 1, wherein the building control system is an environmental control system including a plurality of field panels connected to the plurality of field devices, and wherein the plurality of field devices include environmental control devices selected from the group consisting of air conditioners, heaters, thermostats, dampers, and lights.

13. The interface system of claim 1, wherein the physical world hyperlink being a barcode.

14. The interface system of claim 1, further comprising the at least one mobile computing device, which includes a camera, a processor, and a transceiver, the camera configured to obtain an image of the building information indicia, the processor configured to transfer the image into the indicia data, and the transceiver configured to transmit the indicia data to the building control system.

15. A method of controlling field devices in a building, the method comprising:
receiving indicia data from a mobile computing device, the indicia data associated with one of a plurality of building information indicia positioned at different locations in the building;
wherein said building information indicia is a physical world hyperlink linking a physical location within the building that is associated with the building information indicia with the mobile computing device that reads the building information indicia, where at least one of the building information indicia enables enrollment of the mobile computing device by creation of a record in a user database of a building control system; and controlling operation of at least one of a plurality of field devices within the building based at least in part on the indicia data received from the mobile computing device and a user profile associated with the mobile computing device, wherein the indicia data is received from at least one of the mobile computing devices and the user profile is from the user database.

16. The method of claim 15 wherein the indicia data is first indicia data, the method further comprising:

receiving second indicia data from the mobile computing device, the second indicia data associated with another of the plurality of building information indicia positioned at different locations in the building; and changing operation of the at least one of the plurality of field devices based upon receipt of the second indicia data; and controlling operation of another of the plurality of field devices based at least in part on the second indicia data received from the mobile computing device and the respective user profile associated with the mobile computing device, the respective user profile providing environmental preference information.

17. The method of claim 16, wherein the plurality of field devices include environmental control devices.

18. The method of claim 15, further comprising transmitting building layout data and user location data to the mobile computing devices after receiving the indicia data from the mobile computing devices.

19. The method of claim 18, further comprising displaying a building map and a present location marker on a screen of the mobile computing devices.

20. The method of claim 15 further comprising transmitting equipment data associated with the indicia data to the mobile computing device based on the indicia data from the mobile computing device.

21. A control system for a building comprising:

a plurality of environmental control devices configured to control an environmental condition in the building;

at least one communication circuit configured to communicate with the plurality of environmental control devices using a building network;

a plurality of building information indicia positioned at different locations in the building, each respective building information indicia defining indicia data;

wherein each respective building information indicia being a physical world hyperlink linking a physical location within the building that is associated with each respective building information indicia with at least one mobile computing device that reads the respective building information indicia and that transmits the indicia data to the control system via wireless signals, where at least one of the building information indicia enables enrollment of the at least one mobile computing device by creation of a record in a database of the building control system;

a wireless transceiver configured to receive the wireless signals; and a processing circuit configured to associate a building location and a user profile with each of the mobile computing devices based on the wireless signals, wherein the user profile associated with each mobile computing device specifies at least one parameter to control at least one of the environmental control devices identified from the indicia data received from the mobile computing device and accessing the user profile that resides in the building control system;

generate control signals for the plurality of environmental control devices based at least in part on the building location and the user profiles associated with the mobile computing devices; and deliver the control signals to the at least one communication circuit for communication to the environmental control devices.

* * * * *